US012783936B2

(12) United States Patent
Leung Pah Hang et al.

(10) Patent No.: US 12,783,936 B2
(45) Date of Patent: Nov. 3, 2026

(54) SCALABLE AND ADAPTIVE SELF-HEALING BASED ARCHITECTURE FOR AUTOMATED OBSERVABILITY OF MACHINE LEARNING MODELS

(71) Applicant: ACCENTURE GLOBAL SOLUTIONS LIMITED, Dublin (IE)

(72) Inventors: Denis Ching Sem Leung Pah Hang, Jersey City, NJ (US); Ricardo Hector Di Pasquale, Buenos Aires (AR); Atish Shankar Ray, Herndon, VA (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 1294 days.

(21) Appl. No.: 17/584,098

(22) Filed: Jan. 25, 2022

(65) Prior Publication Data

US 2023/0237366 A1 Jul. 27, 2023

(51) Int. Cl.
*G06N 20/00* (2019.01)
*G06F 18/21* (2023.01)
*G06N 5/025* (2023.01)
*G06N 5/04* (2023.01)

(52) U.S. Cl.
CPC ........... *G06N 20/00* (2019.01); *G06F 18/217* (2023.01); *G06N 5/025* (2013.01); *G06N 5/04* (2013.01)

(58) Field of Classification Search
CPC .......... G06N 20/00; G06N 5/025; G06N 5/04; G06F 18/217
See application file for complete search history.

(56) References Cited

U.S. PATENT DOCUMENTS

| | | | | |
|---|---|---|---|---|
| 10,296,848 B1 * | 5/2019 | Mars | G06F 18/217 |
| 11,580,456 B2 * | 2/2023 | Raj | G06N 20/00 |
| 2017/0330109 A1 * | 11/2017 | Maughan | G06N 5/04 |
| 2019/0147371 A1 * | 5/2019 | Deo | G06N 3/09 706/12 |
| 2020/0012900 A1 * | 1/2020 | Walters | H04L 67/306 |

(Continued)

OTHER PUBLICATIONS

NPL: Author: Nagireddy Karri, Title: Predictive Performance Tuning, Pearl Blue Research Groupl vol. 2, Issue 1, 67-76, 2021 (Year: 2021).*

(Continued)

*Primary Examiner* — Chau T Nguyen
*Assistant Examiner* — Zelalem Shalu
(74) *Attorney, Agent, or Firm* — Mannava & Kang, P.C.

(57) ABSTRACT

Systems and methods for facilitating an automated observability of a ML model are disclosed. A system may include a processor including a model creator and a monitoring engine. The model creator may generate a configuration artifact based on a pre-defined template and a pre-defined input. The configuration artifact may pertain to expected attributes of the ML model to be created. The model creator may generate the ML model based on the configuration artifact. The monitoring engine may monitor a model attribute associated with each ML model based on monitoring rules stored in a rules engine. This may facilitate to identify an event associated with alteration in the model attribute from a pre-defined value. Based on the identified event, the system may execute an automated response including at least one of an alert and a remedial action to mitigate the event.

15 Claims, 13 Drawing Sheets

(56) References Cited

U.S. PATENT DOCUMENTS

| | | | | |
|---|---|---|---|---|
| 2022/0405611 | A1* | 12/2022 | Singla | G06N 5/04 |
| 2024/0394595 | A1* | 11/2024 | Schierz | G06N 5/04 |
| 2025/0322318 | A1* | 10/2025 | Wang | G06N 20/20 |

OTHER PUBLICATIONS

Xiaojing Xie et al., “A Service Mesh-Based Load Balancing and Task Scheduling System for Deep Learning Applications”, 2020 20th IEEE/ACM International Symposium on Cluster, Cloud and Internet Computing (CCGRID), pp. 843-849.

* cited by examiner

1000

1050

SCALABLE AND ADAPTIVE SELF-HEALING BASED ARCHITECTURE FOR AUTOMATED OBSERVABILITY OF MACHINE LEARNING MODELS

BACKGROUND

Machine learning (ML) models are generally used for performing functions such as, for example, prediction, inference, classification, clusterization, pattern matching and other such functions. A plurality of ML models are generally managed using various operationalization frameworks. One such typical exemplary framework may be Machine Learning Model Operationalization Management (MLOps) that can hosts multiple ML models for performing online prediction or inference. The MLOps may not only facilitate the generation of datasets and the ML models, but may also operationalize training and deployment of the multiple ML models in a streamlined manner. After deployment, the ML models may also need to be assessed for observability. The observability may facilitate to identify nature of performance drift of the ML models so as to engage a required action.

However, conventional frameworks tend to solely rely on a code-driven approach. In this approach, a data scientist and a ML engineer may work in independent stages. For example, the data scientist may generate a model artifact for the ML models, while the ML engineer may handle incorporation of rules pertaining to business, monitoring, calibration, compliance and other such rules. This approach may involve long operational and engineering cycles due to the independent stages, as well as slow feedback loop. Further, the conventional frameworks may not allow the configuration of artifacts in a simple manner such as, for example, by use of a ubiquitous language or template. In addition, the conventional approach may fail to address any gap between an actual state of the ML models and an expected behavior or state. Furthermore, as the code-driven approach may highly depend on source codes, any update (such as, for example, change in compliance rules) may be very challenging to update/incorporate, thus limiting the observability of the ML models.

SUMMARY

An embodiment of present disclosure includes a system including a processor. The processor may include a model creator and a monitoring engine. The model creator may generate a configuration artifact based on a pre-defined template and a pre-defined input. The pre-defined input may include at least one of a pre-stored information and an input received from a user. The configuration artifact may pertain to expected attributes of the ML model to be created. The pre-defined template may facilitate incorporation of a set of rules including at least one of monitoring rules and validation rules for the ML model. The model creator may generate the ML model based on the configuration artifact. The ML model may be trained and validated for performing prediction or inference, wherein the ML model is stored in a model registry that stores a plurality of ML models. Each ML model may be provided with a version tag indicative of a specific version of the ML model; The monitoring engine may monitor a model attribute associated with each ML model based on the monitoring rules stored in the rules engine. The identified event may pertain to a drift indicative of deterioration in an expected performance of prediction or the inference of the ML model. The drift may pertain to at least one of a model drift, a data drift or a concept drift. Based on the identified event, the system may execute an automated response including at least one of an alert and a remedial action to mitigate the event.

Another embodiment of the present disclosure may include a method for facilitating automated observability of a ML model. The method may include a step of generating a configuration artifact based on a pre-defined template and a pre-defined input. The pre-defined input may include at least one of a pre-stored information and an input received from a user. The configuration artifact may pertain to expected attributes of the ML model to be created. The pre-defined template may facilitate incorporation of a set of rules including at least one of monitoring rules and validation rules for the ML model. The set of rules may be stored in a rules engine of the processor. The method may include a step of generating the ML model based on the configuration artifact. The ML model may be trained and validated for performing prediction or the inference. The ML model may be stored in a model registry that stores a plurality of ML models. Each ML model may be provided with a version tag indicative of a specific version of the ML model. This may enable a possibility of maintaining a complete baseline. The method includes a step of monitoring a model attribute based on the monitoring rules stored in the rules engine. The model attribute may be associated with each ML model. The monitoring may be performed to identify an event associated with alteration in the model attribute from a pre-defined value. The identified event may pertain to a drift indicative of deterioration in an expected performance of the prediction or the inference of the ML model. The drift may pertain to at least one of a model drift, a data drift or a concept drift. The method may include a step of executing an automated response based on the identified event. The automated response may include at least one of an alert and a remedial action to mitigate the event.

Yet another embodiment of the present disclosure may include a non-transitory computer readable medium comprising machine executable instructions that may be executable by a processor to generate a configuration artifact based on a pre-defined template and a pre-defined input, wherein the pre-defined input may include at least one of a pre-stored information and an input received from a user. The configuration artifact may pertain to expected attributes of the ML model to be created. The pre-defined template may facilitate incorporation of a set of rules including at least one of monitoring rules and validation rules for the ML model. The set of rules may be stored in a rules engine of the processor. The processor may generate the ML model based on the configuration artifact. The ML model may be trained and validated for performing prediction or inference. The ML model may be stored in a model registry that stores a plurality of ML models. Each ML model being provided with a version tag indicative of a specific version of the ML model. The processor may monitor a model attribute based on the monitoring rules stored in the rules engine. The model attribute may be associated with each ML model. The monitoring may be performed to identify an event associated with alteration in the model attribute from a pre-defined value. The identified event may pertain to a drift indicative of deterioration in an expected performance of the prediction or the inference of the ML model. The drift may pertain to at least one of a model drift, a data drift and a concept drift. The processor may execute an automated response based on the identified event. The automated response may include at least one of an alert and a remedial action to mitigate the event.

DETAILED DESCRIPTION

Figure 1:
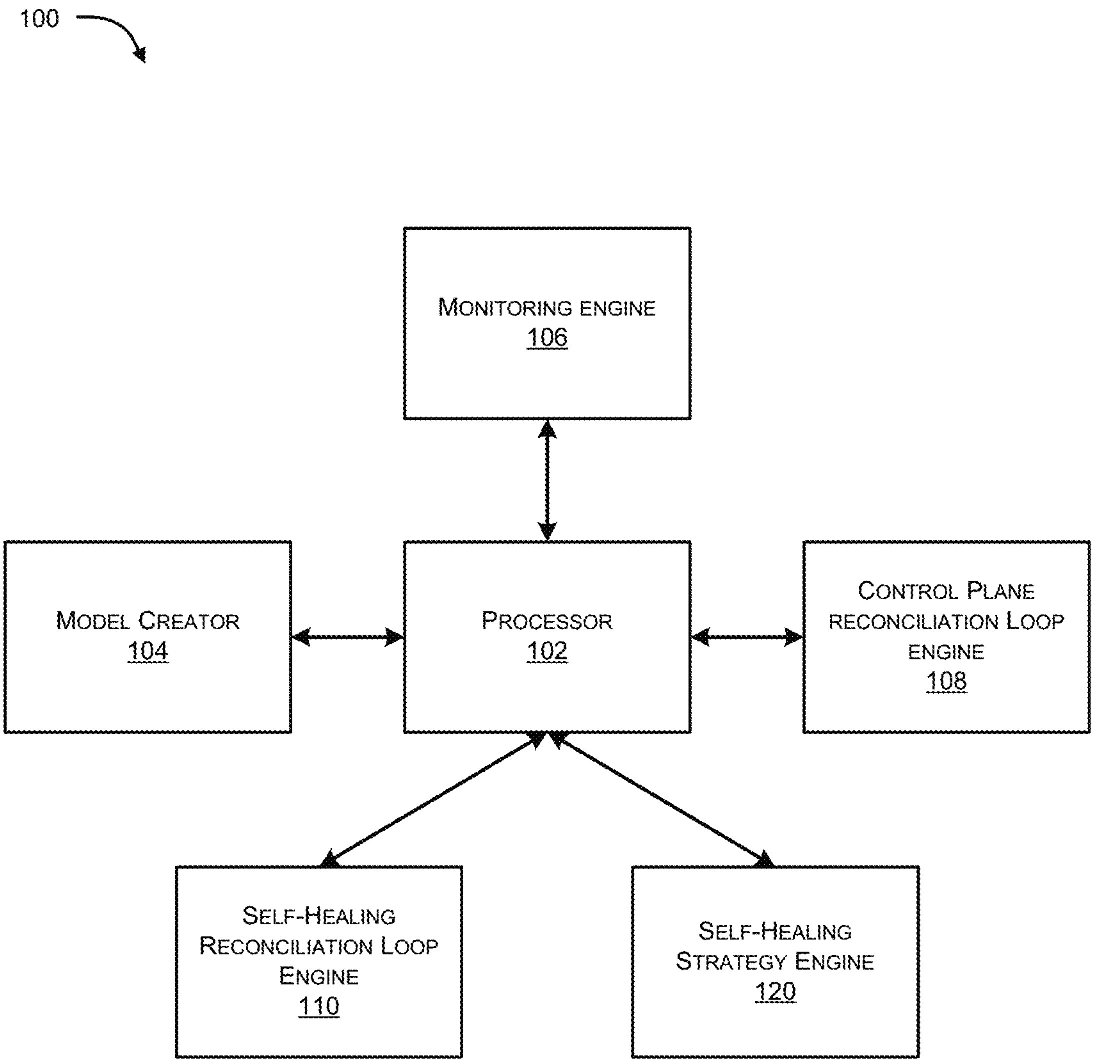
FIG. 1 illustrates a system for facilitating automated observability of a ML model, according to an example embodiment of the present disclosure.

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent, however, that the present disclosure may be practiced without limitation to all these details. Also, throughout the present disclosure, the terms "a" and "an" are intended to denote at least one of a particular element. The terms "a" and "a" may also denote more than one of a particular element. As used herein, the term "includes" means includes but not limited to, the term "including" means including but not limited to. The term "based on" means based at least in part on, the term "based upon" means based at least in part upon, and the term "such as" means such as but not limited to. The term "relevant" means closely connected or appropriate to what is being performed or considered.

Overview

Various embodiments describe providing a solution in the form of a system and a method for facilitating automated observability of a machine learning (ML) model. The system may include a processor. The processor may include a model creator and a monitoring engine. The model creator may generate a configuration artifact based on a pre-defined template and a pre-defined input, wherein the pre-defined input may include at least one of a pre-stored information and an input received from a user. The configuration artifact may pertain to expected attributes of the ML model to be created. The pre-defined template may facilitate incorporation of a set of rules including at least one of monitoring rules and validation rules for the ML model. The model creator may generate the ML model based on the configuration artifact. The monitoring engine may monitor a model attribute associated with each ML model and/or data based measurement (such as data statistic measurement) based on the monitoring rules stored in the rules engine. This may facilitate to identify an event associated with alteration in the model attribute from a pre-defined value. In an example embodiment, the identified event may pertain to a drift indicative of deterioration in an expected performance of the prediction or the inference of the ML model. The drift may pertain to at least one of a model drift, a data drift and a concept drift. The model drift may pertain to a model-oriented measurement. The data drift or concept drift may pertain to data based measurements. Based on the identified event, the system may execute an automated response including at least one of an alert and a remedial action to mitigate the event. In an example embodiment, the processor may include a self-healing reconciliation loop engine to identify variance in states of components pertaining to the ML model by assessing a difference between the expected state and the actual state of the components. The processor may also include a self-healing strategy engine to execute an automated self-healing action to facilitate mitigation of the difference in the expected state and the actual state. In an example embodiment, the processor may include a control plane reconciliation loop engine to assess the configuration artifact pertaining to a specific version of the model. Upon detection of a new configuration artifact pertaining to a new version of the ML model, the configuration database may be automatically updated to include the new configuration artifact.

Exemplary embodiments of the present disclosure have been described in the framework for facilitating automated observability of the ML model through implementation of scalable and adaptive self-healing based architecture. The architecture includes a processor integrated with elements for example, runtime plane and control plane to provide improved maintainability and observability of ML models. The architecture of the present disclosure thus integrates adaptive self-healing feature in Machine Learning Model Operationalization Management (MLOps). Without departing from the scope, the term "processor" may relate to a single central processing unit (CPU) or may be spread across a plurality of CPUs on at least one motherboard and/or by implementation of cloud based environment. The overall implementation facilitates data scientists and ML engineers with a framework to describe aspects/rules pertaining to the observability and automated mitigation of events such as, for example, performance drift of the ML models. This is achieved by allowing a user to state a base line not only in model source code level but in configuration artifact as well through one or more components of the control plane. This aspect also facilitates to observe the actual and expected behavior of the ML models and to provide a context for debugging. Further, the system facilitates reconciliation loops to address gap in the actual and expected behavior of the state of implementation of ML models. Although the system and method of the present disclosure is described with respect to observability of the ML models, however, one of ordinary skill in the art will appreciate that the present disclosure may not be limited to such applications.

FIG. 1 illustrates a system 100 for facilitating automated observability of a ML model, according to an example embodiment of the present disclosure. The system 100 may be implemented by way of a single device or a combination of multiple devices that are operatively connected or networked together. The system 100 may be implemented in hardware or a suitable combination of hardware and software. The system 100 includes a processor 102. The processor 102 may include a model creator 104, a monitoring engine 106 and a rules engine (not shown). The model creator 104 may generate a configuration artifact based on a pre-defined template and a pre-defined input, wherein the pre-defined input may include at least one of a pre-stored information and an input received from a user. The configuration artifact may pertain to expected attributes of the ML model to be created. In an example embodiment, the pre-defined template may facilitate incorporation of a set of rules including at least one of monitoring rules and validation rules for the ML model. The set of rules are stored in the rules engine. The model creator 104 may generate the ML model based on the configuration artifact. The ML model may be trained and validated for performing prediction or inference. The ML model may be stored in a model registry that stores a plurality of ML models. Each of the plurality of ML models may be provided with a version tag indicative of a specific version of the ML model. The monitoring engine 106 may monitor a model attribute based on the monitoring rules stored in the rules engine. The model attribute may be associated with each ML model to identify an event associated with alteration in the model attribute from a pre-defined value. The identified event may pertain to a drift indicative of deterioration in an expected performance of the prediction or the inference of the ML model. The drift may pertain to at least one of a model drift, a data drift and a concept drift. Based on the identified event, the system 100 may execute an automated response including at least one of an alert and a remedial action to mitigate the event. In an example embodiment, the identified event may include at least one of a variance in state of components of the ML model, increase in execution time of the ML model beyond a predefined limit, modification in compliance requirements of the system, modification in policy requirements of the system, modification in the version of the ML model, deviation in the model attributes beyond a pre-defined threshold, and observed deviation in data associated with the ML model. Based on the identified event, the remedial action may include execution of at least one of an automated training pipeline, automated update of the configuration artifact, an automatic version rollback and an automated release pipeline of the ML model, wherein the automated release pipeline includes execution of release of the ML model based on the configuration artifact corresponding to the release pipeline.

The system 100 may also include a self-healing reconciliation loop engine 110, a self-healing strategy engine 120 and a control plane reconciliation loop engine 108. The self-healing reconciliation loop engine 110 may perform an assessment loop to identify the variance in states of components pertaining to the ML model. This may be performed by assessing a difference between an expected state and an actual state pertaining to configuration of components associated with the version of the ML model. In an example embodiment, an absence of the variance in states may be indicative of an expected functioning of the model. In an alternate example embodiment, presence of variance in state may be indicative of a factor pertaining to at least one of the drift and introduction of the new version of the ML model. Upon identification of the difference in the expected state and the actual state, the self-healing strategy engine 120 may execute an automated self-healing action to facilitate mitigation of the difference in the expected state and the actual state. The control plane reconciliation loop engine 108 may assess the configuration artifact pertaining to the specific version of the model. In an example embodiment, upon detection of a new configuration artifact pertaining to the new version of the ML model, the configuration database may be automatically updated to include the new configuration artifact.

The system 100 may be a hardware device including the processor 102 executing machine readable program instructions to facilitate automated observability of a ML model. Execution of the machine readable program instructions by the processor 102 may enable the proposed system to facilitate the automated observability of the ML model. The "hardware" may comprise a combination of discrete components, an integrated circuit, an application-specific integrated circuit, a field programmable gate array, a digital signal processor, or other suitable hardware. The "software" may comprise one or more objects, agents, threads, lines of code, subroutines, separate software applications, two or more lines of code or other suitable software structures operating in one or more software applications or on one or more processors. The processor 102 may include, for example, microprocessors, microcomputers, microcontrollers, digital signal processors, central processing units, state machines, logic circuits, and/or any devices that manipulate data or signals based on operational instructions. Among other capabilities, processor 102 may fetch and execute computer-readable instructions in a memory operationally coupled with system 100 for performing tasks such as data processing, input/output processing, monitoring of the ML models, automated response for event mitigation and/or any other functions. Any reference to a task in the present disclosure may refer to an operation being or that may be performed on data.

Figure 2:
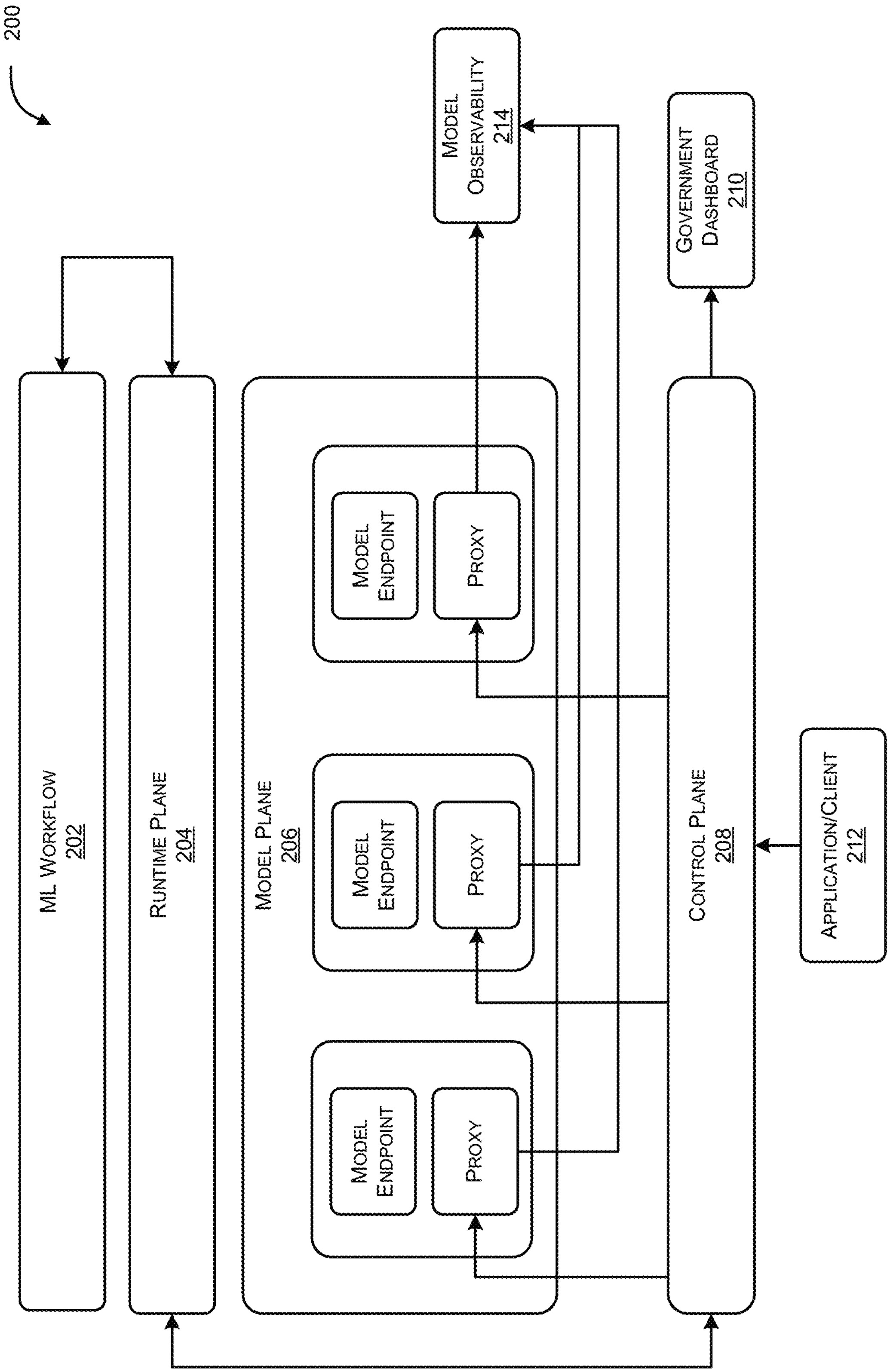
FIG. 2 illustrates an exemplary representation of scalable and adaptive self-healing based architecture for facilitating automated observability of a ML model, according to an example embodiment of the present disclosure.

FIG. 2 illustrates an exemplary representation 200 of a scalable and adaptive self-healing based architecture for facilitating automated observability of a ML model, according to an example embodiment of the present disclosure. The automated observability of the ML models may be attained by integrating the components of the system 100 (as described in FIG. 1) with the architecture, as illustrated in FIG. 2. The scalable and adaptive self-healing based architecture 200 of the present disclosure may include a runtime plane 204, a control plane 208, a model plane 206 and ML workflows 202. The ML workflows 202 may define one or more aspects related to phases of implementation of the ML models such as, for example, data collection, building datasets, model training and refinement, evaluation, deployment and other such aspects. The model plane 206 may be a platform/component that facilitates to host the plurality of the ML models through one or more model endpoints pertaining to each ML. The term "endpoint" may refer to a pathway/address for locating a client request to a suitable ML model (of the plurality of models) in a consumption stage to facilitate prediction or inference based inferences by the ML model. For example, the model endpoint can be a Uniform Resource Locator (URL). In an example embodiment, each model endpoint may be associated with a model proxy. The model proxy may be a proxy instance pertaining to each ML model/model endpoint. The model proxy may facilitate a communication platform for the control plane 208 to communicate with each ML model/model endpoint to handle tasks such as, for example, monitoring performance drift of ML models, self-healing actions and other mitigation tasks associated with the ML models.

In an example embodiment, one or more components of the processor 102 (of FIG. 1) may be a part of the control plane 208 and/or the runtime plane 204. The control plane 208 may provide crucial functions pertaining to the automated observability. For example, the control plane 208 may handle configuration, administrative, security and monitoring related functions. In an example embodiment, the runtime plane 204 may facilitate functions such as, for example, establishing communication between the model plane 206 and the control plane 208 through techniques, such as, for example, Asynchronous messaging system. In an example embodiment, upon receiving a request for model prediction or the inference from an application (or client) 212, one or more components of the runtime plane 204 may mediate the request to model proxy pertaining to a model endpoint of a suitable ML model via an application programming interface (API). The runtime plane 204 may include components that collect ground truth from the application and/or perform monitoring of the ML model, based on the monitoring rules. The ground truth may be related to accuracy or correctness of the inference derived from the model prediction or the inference. The control plane 208 may assess the ground truth to evaluate one or more indicators that facilitate to identify instances/events such as, for example, drift in model performance. Based on the identified instances/events, the system can perform automated mitigation of the events. The overall integration of the adaptive self-healing based architecture in the system 100 allows the model observability at an interface 214. The activities/functions of the control plane 208 may be accessible through a government dashboard 210.

Figure 3:
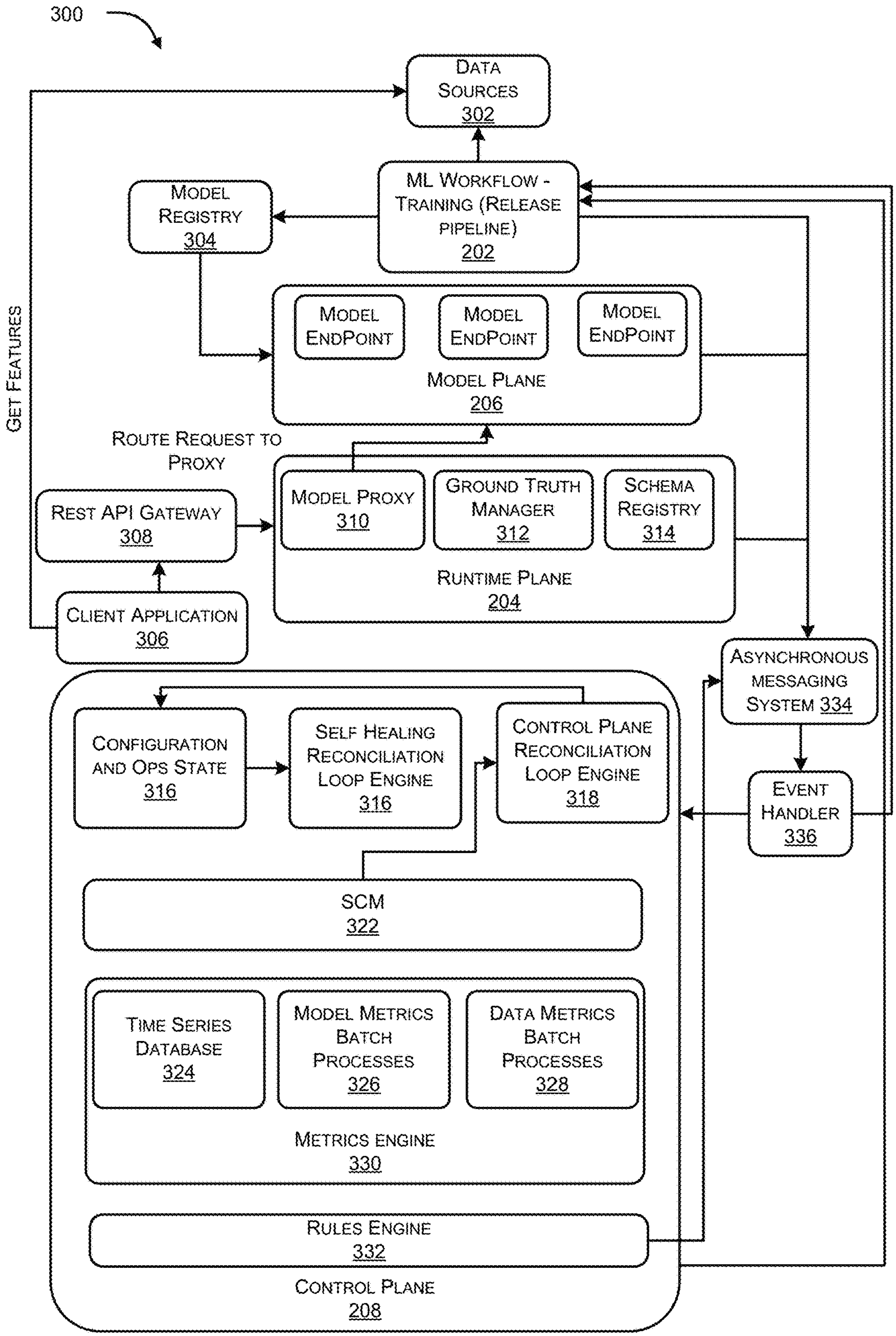
FIG. 3 illustrates an exemplary representation depicting an integration of the scalable and adaptive self-healing based architecture with the components of the system of FIG. 1, according to an example embodiment of the present disclosure.

FIG. 3 illustrates an exemplary representation 300 showing an integration of the scalable and adaptive self-healing based architecture with the components of the system 100 of FIG. 1, according to an example embodiment of the present disclosure. As illustrated in FIG. 3, the implementation may include one or more data sources 302 that may be repositories for storing data. In an example embodiment, the data source may be associated with a cloud based computing platform. The system may also include ML workflows 202 (as described in FIG. 2) that may be coupled with the one or more data sources. The ML workflows 202 may facilitate a user to provide inputs for the generation of the configuration artifact pertaining to expected attributes of a Machine Learning (ML) model to be created. In the context of the present disclosure, the term "user" may pertain to technical individuals such as, for example, data scientists, engineers, ML engineers and other technical individuals involved in the development of the present architecture. The user may be able to define/describe, through the ML workflows 202, one or more aspects in the configuration artifacts pertaining to various phases implemented during the generation and execution of the ML models for improved observability. For example, the user may be able to define one or more aspects in the configuration artifacts pertaining to, for example, automated training pipeline, model training, model refinement, model attributes, evaluation of performance, monitoring rules, validation rules, a release pipeline, model deployment to production and other such aspects. The configuration artifact may pertain to expected attributes of the ML model to be created. In an example embodiment, the configuration artifact may be individually generated corresponding to at least one of an automated training pipeline, the model attributes, a data source and a release pipeline. The pre-defined template may facilitate incorporation of a set of rules including at least one of monitoring rules and validation rules for the ML model. The set of rules may be stored in the rules engine of the processor.

Based on the configuration artifact, the model creator 104 (FIG. 1) may generate the ML model. In an example embodiment, the ML model may be generated based on the configuration artifact pertaining to model attributes. This configuration artifact may include pre-defined template and pre-defined input. In an example, the pre-defined input may pertain to model attributes. For example, the model attributes may include model name, model ID, summary of intended function, model group, model type, algorithm details, input schemes, storage location, user name, output schemes. In an example embodiment, the pre-defined input may include at least one of a pre-stored information and an input received from a user. The pre-defined input may also include pre-defined schema and/or pre-defined rules or settings such as, for example, measurements related to types of parameters to be measured, validation rules, time window slot (TWS), monitoring rules, automated mitigation details rules and other such attributes. Various other categories of inputs may be included in the configuration artifact pertaining to the model attributes. In an example embodiment, the ML model may be further trained and validated for performing prediction or the inference. The training may be performed based on the configuration artifacts related to the training pipeline as stored in the data sources/ML workflows. In an example embodiment, for each ML model, the system may facilitate generation of plurality of configuration artifacts pertaining to the automated training pipelines. For example, in case of a ML model trained using a upon detection of a performance drift of the model, the automated mitigation may include a notification/recommendation indicating a requirement for correction or confirmation of changes in at least one of the validation rules or dataset for performing re-training of the ML model based on a second configuration artifact (of the plurality of configuration artifacts) pertaining to another training pipeline. In an example embodiment, the notification/recommendation may be sent to a ML author and may pertain to change/recommended change in validation rules/dataset pertaining to the configuration artifact. In an alternate example embodiment, the system may automatically perform the change in dataset and/or the re-training of the ML model. The configuration artifacts associated with the automated training pipeline may be generated by using the pre-defined templates and predefined input. For example, the configuration artifacts associated with the automated training pipeline may pertain to design decisions associated to the training pipeline, data sources design, output configuration, model registry configuration, source code, and other such inputs. The predefined input may be related to model attributes related to training of the ML model. For example, the model attributes may include model ID, automated model training type, scheduler for auto-run, steps of configuration and other such details. In an alternate example embodiment, the configuration artifact may be created for data sources for utilizing in the training pipeline. In an example embodiment, the configuration artifact pertaining to the data sources may include multiple configuration artifacts. For example, this may include public data based configuration artifact pertaining to the data sources. This configuration artifact may be created for feature engineering and may use public data, for example, public census based income data. As another example, the configuration artifact pertaining to the data sources may also be based on information pertaining to input data for ML model training.

In an example embodiment, the configuration artifact may also define release pipeline of the ML model (after training). The release pipeline may pertain to a releasing an ML model into a production phase. In the production phase, the ML model is used for prediction or the inference based on real world data/request. In an example embodiment, the configuration artifact may pertain to release pipeline that may include at least one of a basic rolling update release pipeline and a champion challenger release pipeline. The configuration artifact pertaining to the basic rolling update release pipeline may include information pertaining to, for example, type of release pipeline, metadata pertaining to the model, the type of pipeline, details/configuration pertaining to release pipeline, details pertaining to serving cloud instances and other such details. The configuration artifact pertaining to the champion challenger release pipeline may include information pertaining to, for example, type of release pipeline, metadata pertaining to the model, details/configuration pertaining to release pipeline, serving cloud instances, details pertaining to measurements for model evaluation, range limits related to evaluation and other such details. The measurements pertaining to model evaluation may assess automatically if a new version of the model (challenger) may outperform an existing version of the model (champion) that may also in use.

The system may facilitate creation of the ML model based on the corresponding configuration artifact (related to the model attributes). The system may also include a model registry 304 that may store the plurality of ML models. In an example embodiment, the model registry 304 may be considered as a repository used to store the trained ML models. Further, in accordance with the implementation as described in FIG. 2, the system in FIG. 3 may include a model plane 206, a runtime plane 204 and a control plane 208. As explained earlier in FIG. 2, the model plane 206 mainly hosts the plurality of ML models that are stored in the model registry 304. As illustrated in FIG. 3, an application (also referred to as client application) 306 may require a ML model (from the plurality of ML models) to perform a prediction or the inference in a consumption stage. The term "consumption stage" may pertain to a given timeline in which the version of the ML model may be available for performing the prediction or the inference. To attain this objective, the application may send a request to the system through REST API gateway 308. The runtime plane may include a model proxy engine 310 that may route the request to the model proxy pertaining to the model endpoint of a suitable ML model (from the plurality of ML models hosted by the model plane 310). The model proxy engine 310 may also facilitate traffic management pertaining to multiple requests from multiple client applications. For example, if a new version of the ML model may be required to be tested, then the model proxy engine may ensure that a small percentage of the traffic may be directed to the model endpoint pertaining to the new version, while the remaining traffic may be directed to an existing functioning model. In another example, if the new version of the ML model may be required to be tested, then the model proxy engine may ensure that the workload is duplicated and directed to the model endpoint pertaining to the new version to enable the new version to function in the shadows. Once the performance of the new version may be found to exceed a predefined threshold then the new version of the ML model may be deployed in production. This may ensure that the traffic may not be interrupted by introduction/release of the new version of the ML model.

The runtime plane may include a ground truth engine to collect ground truth or reality pertaining to accuracy/correctness of the prediction or the inference by the ML model in the consumption stage. The term "ground truth" may pertain to actual information related to the request for which prediction or the inference was performed, and is collected at the location of the client using the application. In an example embodiment, the ground-truth engine may collect a set of inferences from the application through the API. The set of inferences may pertain to ground truth of the prediction or the inference performed by the ML models. The set of inferences may include a pre-defined number of inferences collected over a definite period of time in the consumption stage. In an example embodiment, the ground truth may be collected by at least one of processing data pipelines within the application, or by implementing elastic stack (ELK) logs in the cloud (batch style), or by processing via online Hypertext Transfer Protocol (HTTP) rest service. For example, if the ground truth may be collected by online HTTP mode, in that case, after receiving predictions or the inference, the application may receive a transaction ID and a trace ID for tracking further actions. In the instant example, upon knowing the ground truth, the application (client) may be able to post the ground truth along with the transaction ID and a trace ID, which may be collected by the ground truth engine. It may be appreciated that the present disclosure may not be limited by the mentioned examples/embodiments for obtaining the ground truth of the predictions or the inference by the ML models.

Referring to FIG. 3, and in an example embodiment, the control plane 208 may include a metrics engine 330 to evaluate the set of inferences received from the ground truth engine. This may be done to obtain a set of metrics including at least one of model metrics and data metrics. The model metrics may pertain to the ML model. The data metrics may pertain to the pre-defined input/pre-stored inputs associated with the ML model. The metrics engine may also collect data pertaining to the prediction or the inference by the ML model, which may be collected over pre-defined time intervals and stored in a time series database 324. In an example embodiment, the assessment of the ground truth may facilitate metering process to process raw data with the aim of providing indicators. For example, the set of metrics obtained by the metrics engine may include indicators to facilitate tracking performance of the plurality of ML models. The indicators may pertain to a trend in prediction or the inference accuracy of the ML model over a given period of time. The metering process may include metric batch processes 326 pertaining to the ML model and data batch processes 328 pertaining to the data related to the ML model. The metric batch processes may be scheduled to run periodically. The system may also include a Software Configuration Management (SCM) tool 322 that may include repository (such as Git Repository) and a public cloud storage resource (such as AWS S3). In an example embodiment, the runtime plane 204 may facilitate functions such as, for example, establishing communication between the model plane 206 and the control plane 208 through a messaging bus including an asynchronous messaging system 334 and an event handler 336.

The control plane 208 may also include rules engine 332 for storing the set of rules including at least one of monitoring rules and validation rules for the ML model. The set of rules may be defined by the user during the generation of the configuration artifact so as to generate an alert and/or an action. For example, the user may choose to define a first monitoring rule, such as, for example, to trigger an alert if there may be five or more consecutive time slots where a specific version of the ML model shows to have a consistent negative derivative, and Area under curve for receiver operating characteristic (roc_auc) metric may be under 0.76. In the instant example, if based on the indicators (derived from ground truth), the above mentioned criteria/rule is satisfied, then a model drift may not be present. However, in the instant example, if based on the ground truth, indicators and/or metrics (derived from ground truth engine/metrics engine), the above mentioned criteria/rule may not satisfied, then a model drift may be identified and alert may be generated. In an alternate embodiment and in reference to the same example, the user may also be able to define an action to be triggered upon occurrence of an event. For example, in addition to the first monitoring rule, a second monitoring rule may also be included that may state to re-train the ML model with new dataset upon identification of an event, such as, for example, the performance drift. In an example embodiment, the indicators may be provided as serverless functions and may be served on line and/or may be calculated in a batch manner. The identification of the event (such as assessment of performance drift) may also be performed based on comparison between the indicators and baseline metrics pertaining to the model.

In an example embodiment, the processor may also be coupled with a database. The database may include a serverless configuration database and a machine learning operations (MLOps) database. the serverless configuration database may store the configuration artifact. The serverless configuration database may facilitate information related to an expected state (or a Configuration state as shown in 316) pertaining to configuration of components of the ML model. The MLOps database may facilitate information related to an actual state (or Ops state as shown in 316) pertaining to the components of the ML model.

Figure 4A:
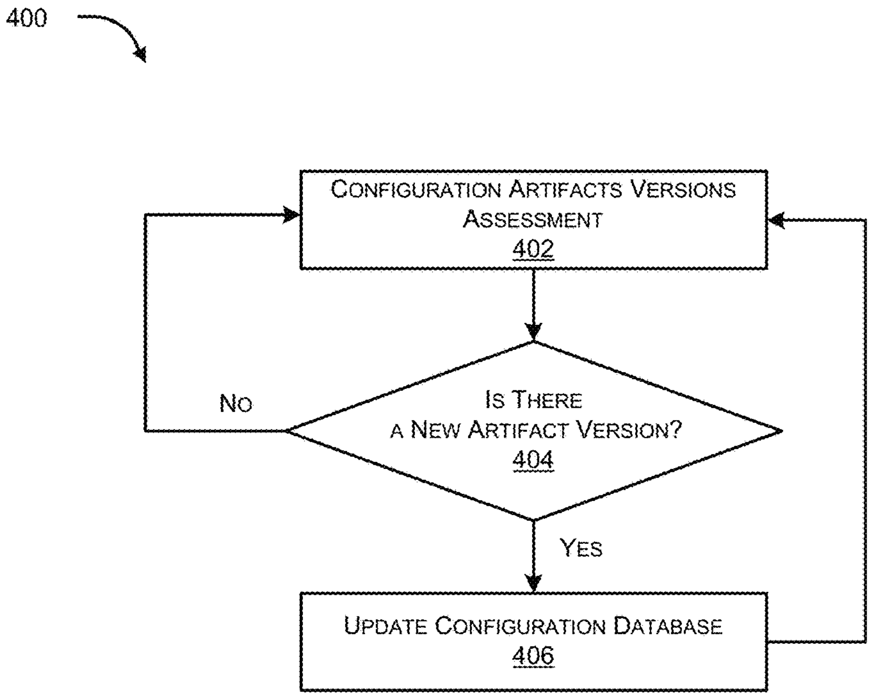
FIG. 4A illustrates an exemplary representation depicting an assessment performed by a control plane reconciliation loop engine of FIG. 3, according to an example embodiment of the present disclosure.

In reference to FIG. 3, and in an example embodiment, the processor (or the control plane 208) may include a control plane reconciliation loop engine 320. FIG. 4A illustrates an exemplary representation 400 showing an assessment performed by control plane reconciliation loop engine 318 (of FIG. 3), according to an example embodiment of the present disclosure. As illustrated in FIG. 4A (and FIG. 3), at 402, the control plane reconciliation loop engine 318 may assess the configuration artifact pertaining to the specific version of the model. At 404, based on the assessment, the engine 318 may check if a new configuration artifact (or a new version) is existing. At 406, if detection of the new configuration artifact may occur, the configuration database may be automatically updated to include the new configuration. This may be applicable in scenarios such as, for example, when a new version of the ML model is introduced. In an alternate embodiment, the control plane reconciliation loop engine 318 may detect a syntax error, or an exception (for example, a condition that cannot be executed), and may provide a failing state of the corresponding ML model (related to the specific version) to the Ops State. In this scenario, by the time manual assistance may be provided to correct the error, the processor may execute previous version of the ML model to prevent failure. The control plane reconciliation loop engine 318 may only detect new configuration artifacts for error handling and may not lead to change in state of components of the system, thereby providing security to production environment. This aspect also allows to handle error events through a dashboard. Further, the error handling by the engine 318 may be accompanied with one or more triggering mechanisms. For example, asynchronous calls such as, for example, SCM system (for example, Git repository and S3 buckets) may enqueue a "new version" message for one or more configuration artifacts. In another example, a generic poll may be scheduled such that it enables the control plane reconciliation loop engine 320 to feature a full round run by checking each ML model.

Figure 4B:
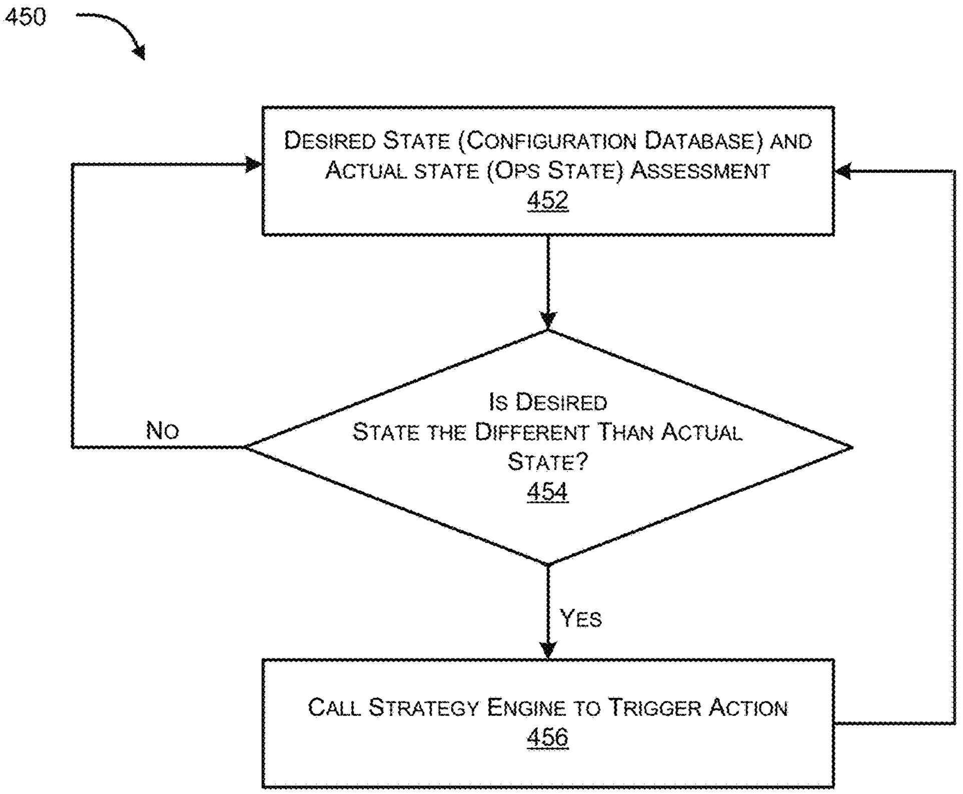
FIG. 4B illustrates an exemplary representation depicting an assessment performed by a self-healing reconciliation loop engine of FIG. 3, according to an example embodiment of the present disclosure.

In reference to FIG. 3, and in an example embodiment, the processor (or the control plane 208) may include a self-healing reconciliation loop engine 316. FIG. 4B illustrates an exemplary representation 450 showing an assessment performed by self-healing reconciliation loop engine 316 (of FIG. 3), according to an example embodiment of the present disclosure. As illustrated in FIG. 4B (and FIG. 3), at 452, the self-healing reconciliation loop engine 316 may perform an assessment loop. At 454, the assessment loop can assess a difference between the expected state and the actual state pertaining to configuration of components associated with the specific version of the ML model. For example, the actual state (or Ops state) may pertain to actual operational state of components pertaining to the ML model. In this case, the information pertaining to the actual state may be obtained from the MLOps database. In another example, the expected state (or a Configuration state) may pertain to an expected configuration of the components of the ML model. The information pertaining to the expected state may be obtained from the serverless configuration database. The assessment may be performed to identify the variance in states of components pertaining to the ML model. In an example embodiment, the absence of the variance in states (when decision box 454 indicates "no") may be indicative of an expected functioning of the model (expected state and actual state being in agreement). In an example embodiment, the presence of variance in state (when decision box 454 indicates "yes") may be indicative of a factor pertaining to at least one of the model drift and introduction of the new version of the ML model. In an example embodiment, upon identification of the difference in the expected state and the actual state, the self-healing reconciliation loop engine 316 may execute an automated self-healing action to facilitate mitigation of the difference in the expected state and the actual state. For example, the automated self-healing action may correspond to an action related to at least one of deletion of a component, addition of a component, and update of an existing component of the ML model.

In an example embodiment, the self-healing reconciliation loop engine 316 may run the assessment of state for each object/component associated with the configuration of the system. Each component in the system may have a unique identifier (for example, a primary key). The assessment may be done by requesting actual configurations for every component ("AC" set) and actual system state ("AS" set). Every component may have a version tag associated with it. The possibilities can be enumerated as follows:

The system has new components (AC's elements not in AS)

The system needs to remove existing components (AS's elements not in AC)

The system has new versions of components (AC's components has newer version tags than same components in AS).

The system needs to rollback components to previous version (AC's components has older version tags than same components in AS).

A combination of one or more of the previous items

No changes were made to the system.

The term "state" may pertain to a value related to a set of operative variables/parameters that may define a situation of the system. For example, if the variables/parameters may be time dependent (variables/parameters change over time), then the state may be a function of time or a time based value, for example, state(t) at a time t. In an embodiment, the variables/parameters may be relative to the current health of the ML models being hosted. The term "actual configuration" for each component (AC set) may be related with the configuration or content of the configuration files introduced into the system by a user. The actual configuration may pertain to a desired state. In an embodiment, if there is a gap between the actual configuration and the actual state of the system (that is the current value of the variables for each component in the system), then the self-healing reconciliation loop may trigger actions to reduce that gap bringing the actual state to the target desired state. For example, the state for a model component may pertain to respective version (being executed in production environment), corresponding active endpoints (i.e. list of endpoints that host actually the model), inactive endpoints (i.e. list of non-deleted endpoints that host old or deprecated version of the model), the error state (if in case of any errors) and other corresponding states. In an example embodiment, once the self-healing model reconciliation loop assessed changes, they may be held into a Change Set (CS). The self-healing reconciliation loop engine 316 may also determine system health by comparing state of a particular component with its desired state. The self-healing reconciliation loop engine 318 may also assess differences between the states of the components and hold them into a Study Set (SS). The self-healing model reconciliation loop may need to evaluate the CS and SS such that if CS and SS are empty, no further action may be needed. Otherwise, the self-healing reconciliation loop engine 316 may take further action. The self-healing strategy engine 120 (FIG. 1) may assess the CS and SS sets as inputs. and may take actions to reduce gaps between the expected (or desired state) and actual state. The self-healing strategy engine 120 may include an absolute order of processing, wherein the self-healing strategy engine 120 may enable at least one of component's deletions, component's creation or addition, and with component's update. In an example embodiment, the component's deletions (Process Deletions function) may consider the CS as input and may iterate on deletions of components. Each component type may have its own deletion procedure that takes care of correct and complete removal. It also provides a way for the system to extend deletion logic by "hook" pattern that triggers custom logic. In an alternate example embodiment, the component's addition (Process New Components function) may takes CS as input and may iterate on "new component" items. Each component type has its own creation procedure that may handle resource allocation. In an example embodiment, the component's update (Process Updates function) may be done through additional modules such as, for example, a component version manager and a state analysis module. The component version manager may consider the CS as input and may iterate on every version change item. A version change may involve the deletion of actual component version (Process Deletion function), and the creation of the new component version (Process New Components function). In an example embodiment, if a concern is detected with a specific version of a ML model (for example old version removed from model store), the component version manager may not allow any change, or it may rollback any changes to preserve operational continuity and avoid issues in production environments. The main objective of the state analysis module may be to decide which actions to take in case that component's health may not be good. The state analysis module may take input as the Study Set (SS). The component's health may be related with liveness and readiness proofs, as well as consistency. The users such as, data scientist or ML engineers may define in the configuration artifacts about which standard measurements should be collected for the component. They may also be enabled to define rules and functions of how the measurements may be evaluated in order to determine whether the component is within the threshold and/or whether some action needs to be orchestrated.

Figure 5A:
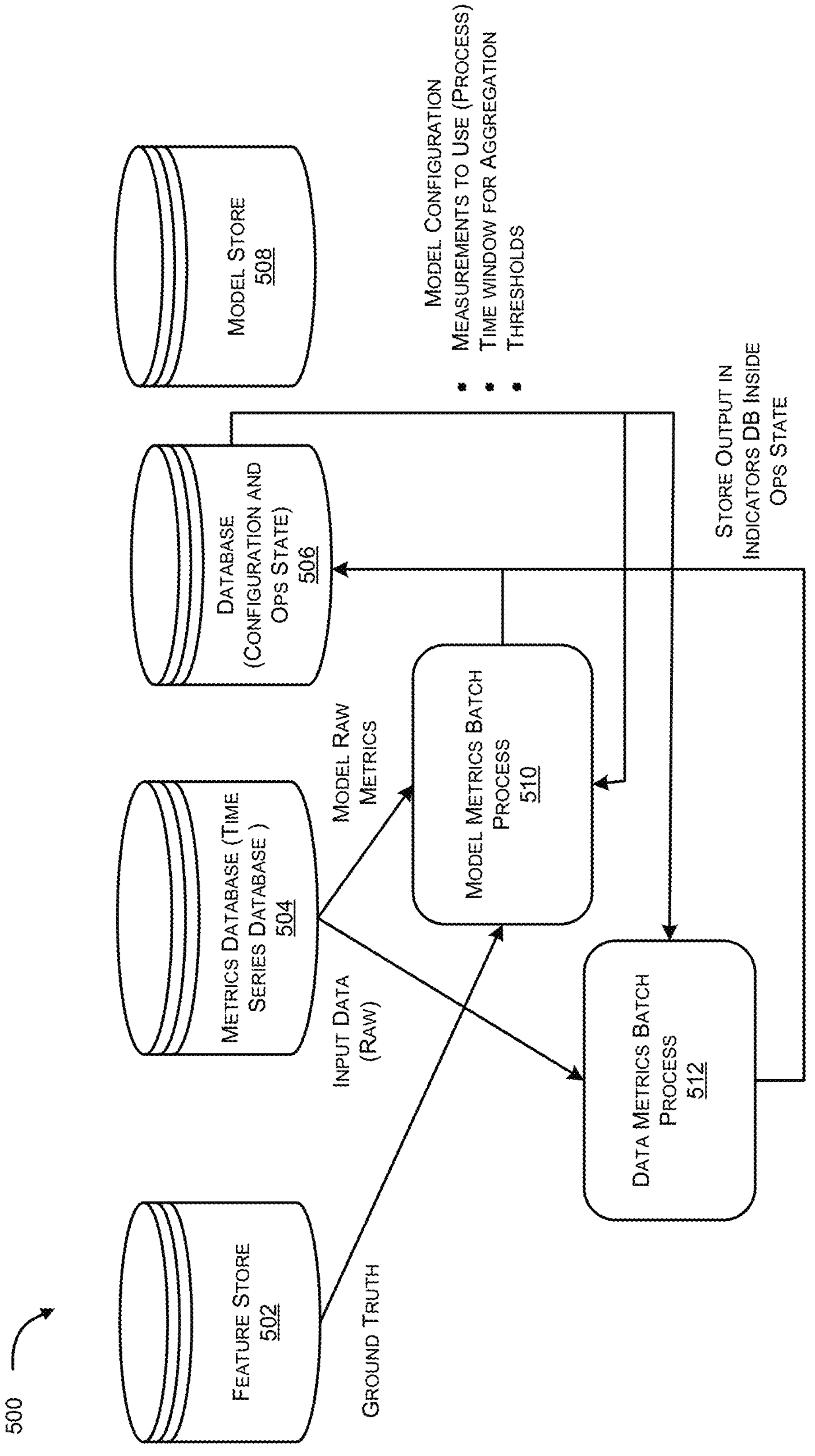
FIGS. 5A-5B illustrate exemplary representations depicting stages of monitoring and implementation of corresponding self-healing action, according to an example embodiment of the present disclosure.
Figure 5B:
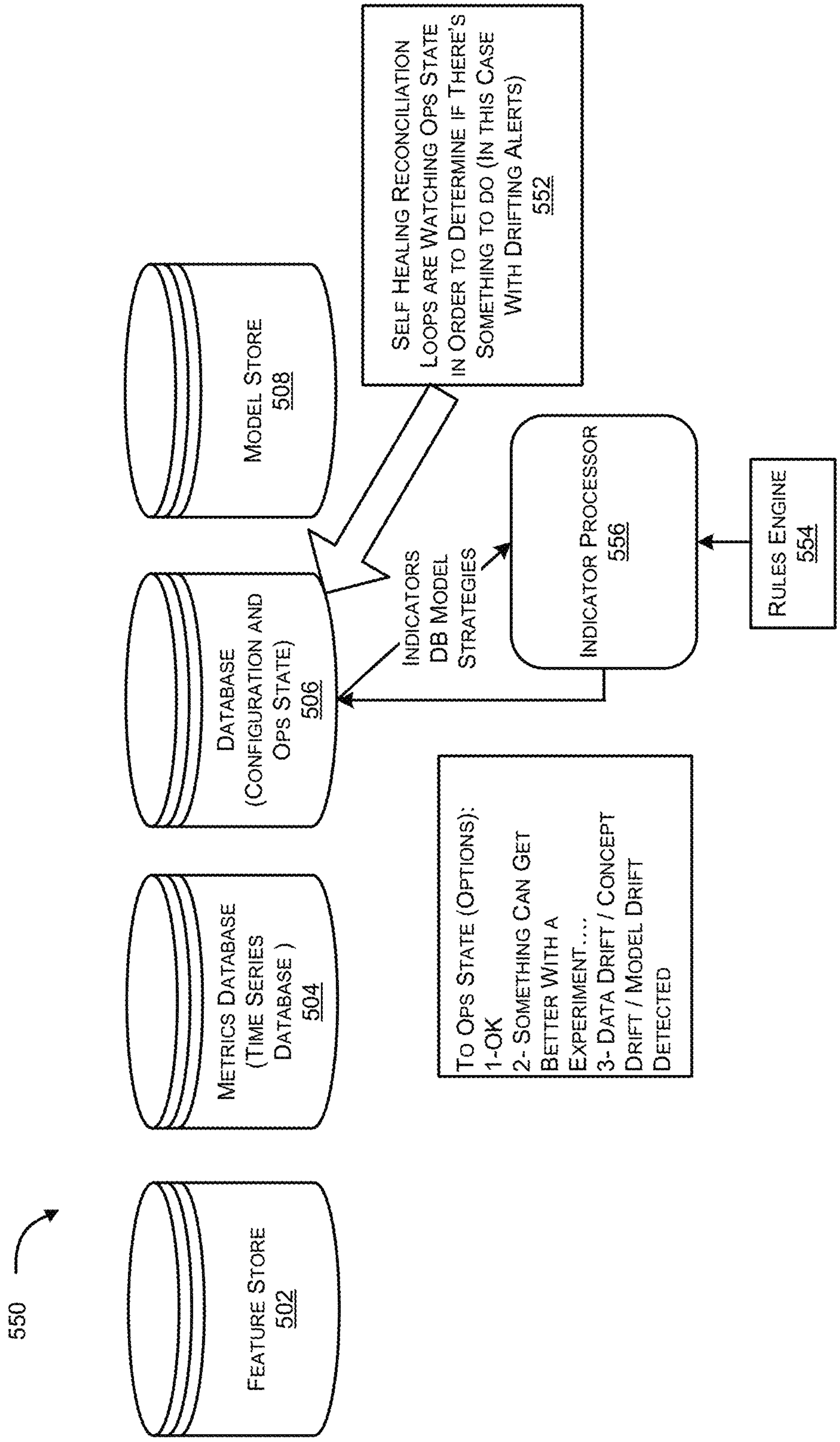

FIGS. 5A-5B illustrate exemplary representations 500 and 550 showing stages of monitoring and implementation of corresponding self-healing action, according to an example embodiment of the present disclosure. As illustrated in FIG. 5A, the system may include components such as, for example, feature store 502, metrics database 504, MLOps database 506, and model store 508. The feature store 502 may facilitate to store data such as, for example, training datasets, testing datasets, information pertaining to features of the ML model. In an example embodiment, the model store 508 may store baseline metrics of the ML model that may pertain to baseline of training metrics. The feature store 502 may facilitate to obtain (and store) ground truth pertaining to a prediction or the inference by the ML model from the ground truth engine. The ground truth obtained by the feature store may be sent to the metrics engine for the metering process. The metering process may include model metric batch process 510 and data metrics batch process 512. The metric batch process 510 may pertain to the ML model and metrics batch process 512 may pertain to data pertaining to the ML model. The metric batch processes may be scheduled to run periodically. In an example embodiment, model raw metrics pertaining to the ML model may be used in the model metric batch process 510. Similarly, raw input data pertaining to the ML model may be used in the data metrics batch process 512. The model raw metrics and the raw input data may be stored in the metrics database 504 (coupled with the metrics engine). The data stored in the metrics database may be tagged. For example, each request pertaining to prediction or the inference by the ML model ML model may be tagged with a transaction ID (TRX ID). In another example, each prediction/inference returned by ML model may be tagged with a TRX ID and a trace ID. In an example embodiment, each processing time (profiling) of the ML model may also be stored in the metric databases 504. The metering process (model metric batch process 510 and data metrics batch process 512) may also receive inputs/data from MLOps database 506. The inputs/data received from the MLOps database 506 may pertain to one or more aspects related to configuration of the ML model such as, for example, active configuration artifacts, measurements to use (such as, for example, accuracy), time window for aggregation, thresholds for measurements, business rules for drift management and other such aspects. The metering process (model metric batch process 510 and data metrics batch process 512) may evaluate set of inferences, based on the ground truth (and/or the baseline metrics), to obtain set of metrics (model metrics and data metrics). For example, the metering process may include processing of one or more standard metrics (by ML model/time window/slot), such as for example, ratio of label predictions or the inference, distribution of predictions or the inference, comparing ground truth with prediction or the inference, and feature statistical metrics used for inference. The distribution of predictions or the inference may be computed based on standard parameters such as, for example, mean median, standard deviation, interquartile range and other such parameters. The comparison of ground truth with prediction or the inference, may be done with respect to measurements such as, for example, accuracy, loss and other such measurements. The output may in the form of indicators that facilitate tracking performance of the plurality of ML models. In an example embodiment, the indicators may be stored in the database (including serverless configuration database and MLOps database). As illustrated in FIG. 5B, the indicator stored in the database 506 may be processed at an indicator processor 556. The indicators may be processed based on the ML model and pre-defined strategies. The indicator processor 556 may also receive inputs from the rules engine 554. The inputs may pertain to dynamic business rules and/or compliance requirements for evaluating the performance drift of the ML model. In an example embodiment, an output of the indicator processor at 556 may be sent to the database 506. The output may reveal one of three possible scenarios. For example, the output may reveal that the performance of the ML model is fine or may need some improvement or there may be a performance drift observed (data drift, concept drift or model drift). In an alternate example embodiment, the self-healing reconciliation loop engine (at 552) may continuously observe MLOps state (through database 506) and based on the observation, the processor may facilitate mitigation of the performance drift by an alert and/or a remedial action.

Figure 6:
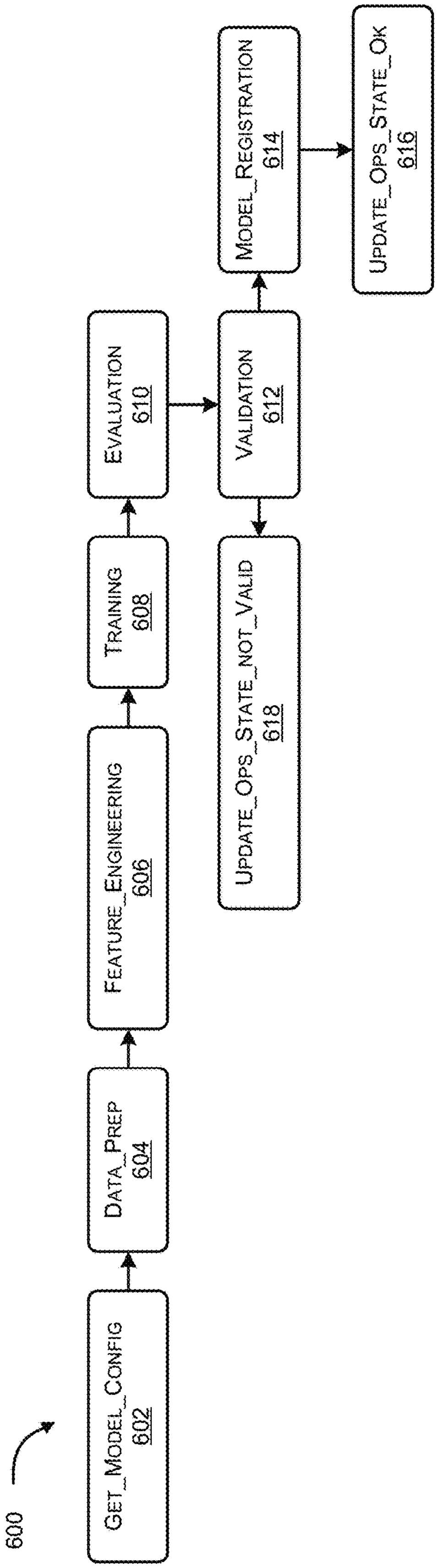
FIG. 6 illustrates an exemplary representation depicting various stages pertaining to validation of a ML model, according to an example embodiment of the present disclosure.

Referring back to FIG. 3, and in an example embodiment, after generation of the ML model, the processor may facilitate training of the model based on the configuration artifact corresponding to the automated training pipeline. In an example embodiment, the ML model may be validated after training based on the validation rules. FIG. 6 illustrates an exemplary representation 600 showing various stages pertaining to validation of ML model, according to an example embodiment of the present disclosure. As illustrated in FIG. 6, at 602, the system may get model configuration details, based on which data may be prepared at 604 and feature engineering may be performed at 606. Based on the outcome of these steps, training of the ML model may be performed at 608. In an example embodiment, after the ML model is trained, an evaluation of the ML model may be performed at 610. The evaluation may mainly involve validation performed at 612. The validation may be done based on the validation rules that are pre-set in the configuration artifact. For example, if the validation rules may be satisfied, the ML model may be registered for subsequent step of release (at 614) and the MLOps state may be updated accordingly, at 616. In another example, if the validation rules are not satisfied, the MLOps state may be updated as “not valid” at 618. In an alternate example embodiment, if the validation rules are not satisfied, the ML model may be re-trained based on another configuration artifact.

Figure 7:
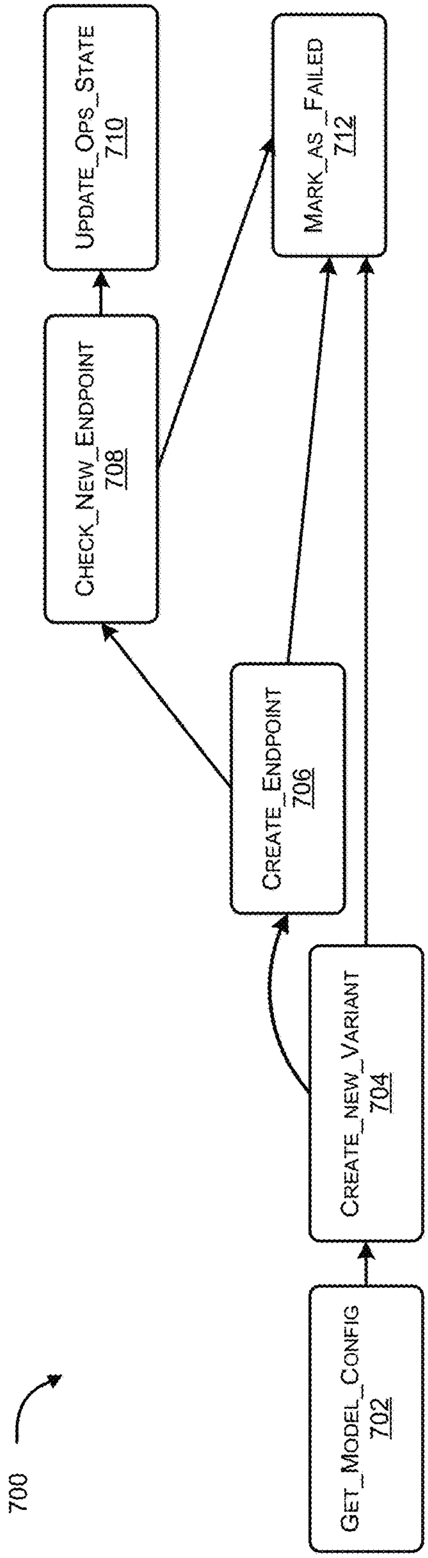
FIG. 7 illustrates an exemplary representation depicting various stages pertaining to release pipeline of a ML model, according to an example embodiment of the present disclosure.

In an example embodiment, upon completion of the training, the next stage for the ML model may include execution of the release pipeline. This stage may enable the ML model (that is trained and validated) to be released into production stage for performing prediction or the inference on real-world data. FIG. 7 illustrates an exemplary representation 700 showing various stages pertaining to release pipeline of the ML model, according to an example embodiment of the present disclosure. As illustrated in FIG. 7, at 702, the system may obtain configuration of the ML model (that is trained and validated). For example, the trained ML model may be a new version of an existing ML model. At 704, the system may create a new variant pertaining to the trained ML model to be released by registering the trained ML model in the model registry. At 706, the system may create an endpoint for the trained ML model. For example, the system may configure a new endpoint for the trained ML model and may wait for a liveness proof provided by cloud environment. At 708, the system may check the new endpoint. The endpoint may be checked by consuming the new endpoint as an extra functional check of readiness. For example, the above mentioned steps ensure that no packet is lost while attempting to consume the trained ML model. If the checking step may indicate failure in functioning of the endpoint (such as, for example, loss in packets) then the trained model (new version) may not be deployed and the deployment may be marked as failed (at 712). If the checking may indicate proper functioning of the endpoint then the trained model (new version) may be released into the production stage and the MLOps state may be updated accordingly (at 710).

Figure 8:
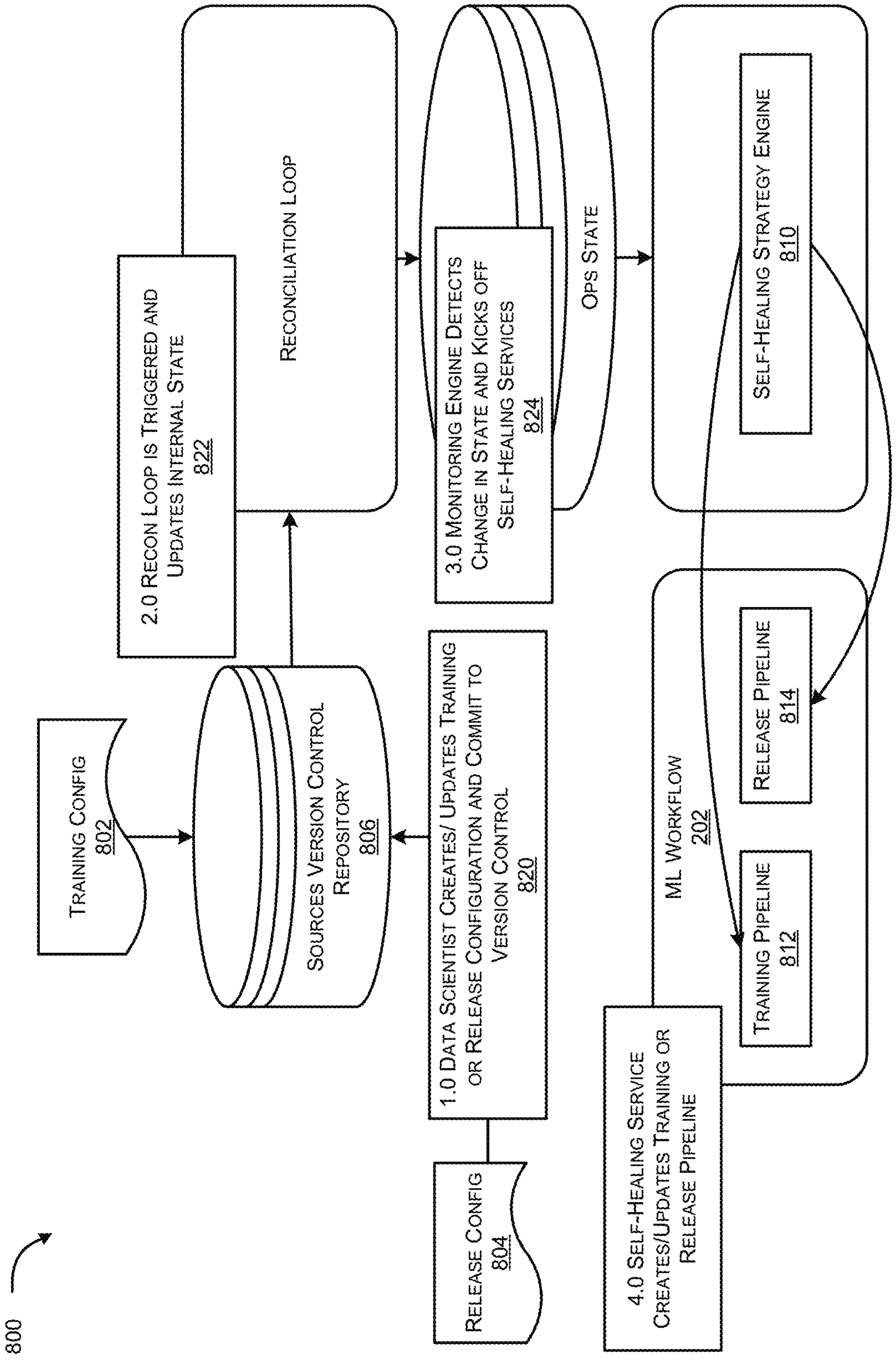
FIG. 8 illustrates an exemplary representation depicting various stages pertaining to training and release of a ML model, according to an example embodiment of the present disclosure.

FIG. 8 illustrate an exemplary representation 800 showing various stages pertaining to training and release of the ML model, according to an example embodiment of the present disclosure. As illustrated in FIG. 8, the system may store training configuration details (802) and release configuration details (804) for a trained ML model to be released. At 820, a user (such as, for example, a data scientist) may create or update the release configuration details (804) and/or the training configuration details (802). The update details may be transmitted to a sources version control repository 806. Upon receiving the update, the system may trigger a reconciliation loop at 822. For example, the control plane reconciliation loop engine and/or self-healing reconciliation loop engine may be triggered. In an example embodiment, upon triggering, the control plane reconciliation loop engine may update the configuration database to include a new configuration artifact (if detected such as, for example, introduction of a new version of the ML model). In an alternate example embodiment, upon triggering, the self-healing reconciliation loop engine may perform an assessment loop to assess difference between the expected state and the actual state pertaining to configuration of components associated with the new version of the ML model. In an alternate example embodiment, upon triggering, the monitoring engine may detect change in state and initiate self-healing action through the self-healing reconciliation loop engine and/or the self-healing strategy engine (810). The self-healing action may pertain to one or more remedial actions. For example, the remedial action may include self-healing service that may create and/or update training pipeline 812 and/or release pipelines 814 in the ML workflow 202. Various other self-healing actions may also be implemented.

Figure 9:
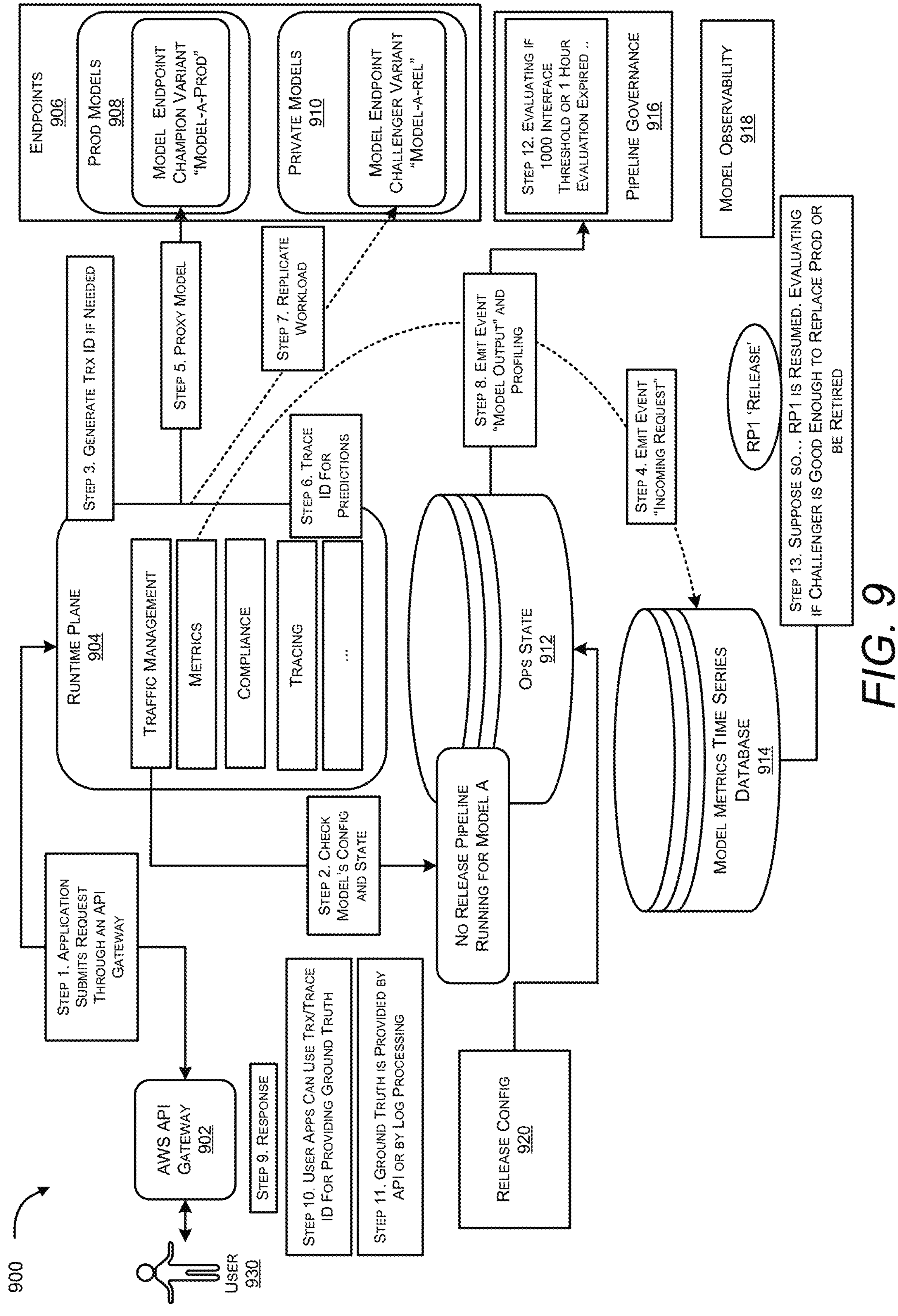
FIG. 9 illustrates an exemplary representation for a champion challenger release pipeline, according to an example embodiment of the present disclosure.
Figure 10A:
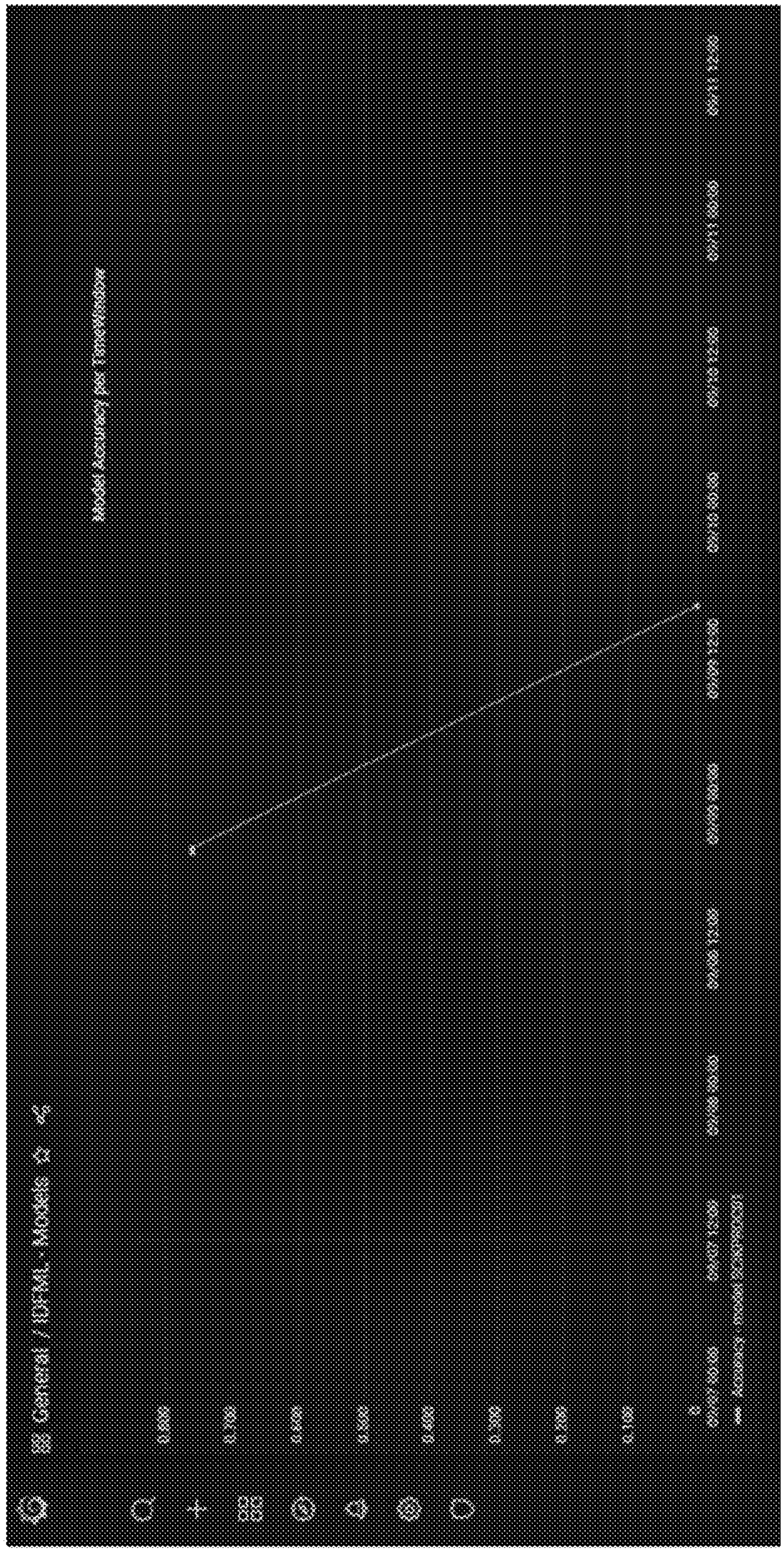
FIGS. 10A-10B illustrate exemplary representations of measurements and latency profile of a ML model, according to an example embodiment of the present disclosure.
Figure 10B:
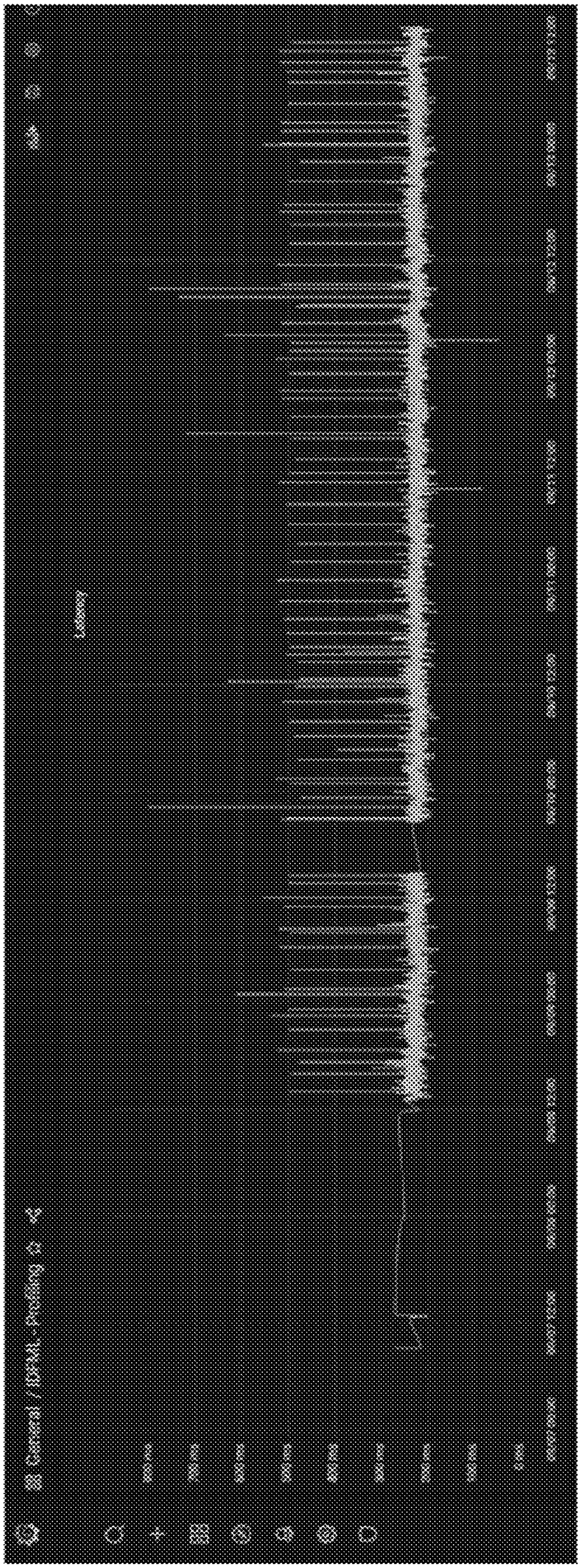

In an example embodiment, the release pipeline may pertain to at least one of a basic rolling update release pipeline and a champion challenger release pipeline. In an example embodiment, the champion challenger release pipeline may evaluate performance of a challenger in comparison to a champion. The challenger may correspond to a new version of the ML model and the challenger may correspond to an existing version of the ML model. The champion challenger release pipeline may be activated by creation of a variant model endpoint corresponding to the new version for collecting inference for the new version. In an example embodiment, the new version of the ML model may be released if the performance of the new version exceeds the performance of the existing version. In an alternate example embodiment, the new version of the ML model may not be released if the performance of the new version fails to exceed the performance of the existing version. FIG. 9 illustrates an exemplary representation 900 for a champion challenger release pipeline, according to an example embodiment of the present disclosure. As illustrated in FIG. 9, a user 930 or a client may submit a request (at step 1) for prediction or the inference by the ML model through an application. The request may be received by the system through the API (such as for example, Amazon Web Services (AWS) API gateway). As explained in FIG. 3, upon receiving the user request, the model proxy engine (in the runtime plane 904) may be responsible for identifying the most suitable ML model (from the plurality of ML models) for performing the prediction or the inference in the model registry. In an example embodiment, a new version of a model (for example, model A) may be intended to be released through the champion challenger release pipeline. The new version of the model may be released into production only if it may outperform the existing version of the ML model (in production). In an alternate example embodiment, the performance of the new version of the ML model may need to be higher than the existing version by a pre-defined percentage (improvement in performance). At step 2, the system may check configuration and state of the ML model in the release configuration details 920 in the database 912 (Ops State). At step 3, the system may generate a transaction ID for the request. At step 4, the system may transmit the details of the request (or incoming request) to a model metrics time series database 914. At step 5, the system (model proxy engine) may direct the request to endpoints 906 that may include model endpoint of available ML models in the registry. For example, the endpoints 906 may include a model endpoint 908 pertaining to the champion (existing model A in production labelled as "Model-A-Prod) and a model endpoint 910 pertaining to the challenger (new version of the model A labelled as Model-A-Rel). At step 5, the model proxy engine may direct entire traffic (pertaining to user requests) to the model endpoint 908 of the champion (Model-A-Prod). At step 6, the system may generate trace ID for predictions or the inference. In accordance with a champion challenger release pipeline, at step 7, replication of workload may be performed. In this case, the challenger (model endpoint 910 of the challenger i.e. the new version Model-A-Rel) may be considered as on-line but "in the shadows". At this stage, the system (or the Ops State) may notice that the model A has the same Production endpoint that is active end point running, but a new release endpoint and a champion challenger release pipeline is in "wait" state. Based on this, the payload to Model-A-Prod may be copied to new challenger endpoint 910 (Model-A-Prod), which may be subjected to the metering process. As a result of this feature, the system may be able to check challenger performance in asynchronous way without affecting latency of production model (Model-A-Prod). In step 8, in the metering process, the system may collect the metrics and transmit the "model output" and profiling features to the model metrics time series database 914. For example, the model output may include measurement of a parameter (such as accuracy) over a time window slot (TWS). In another example, the profiling features may include latency of a model with respect to time. FIGS. 10A-10B illustrate an exemplary representations 1000 and 1050 of measurements and latency profile of ML model, according to an example embodiment of the present disclosure. The measurements pertaining to parameter, such as, for example, accuracy may be measured in a time window slot as shown in FIG. 10A, whereas the latency (with respect to time) may be as shown in FIG. 10B (in exemplary representation 1050). Referring back to FIG. 9, at step 9, the application (user application) may receive the prediction or the inference response through the API. For example, the prediction or the inference response may be returned with transaction ID and trace ID for each prediction or the inference. At steps 10 and 11, the application may use transaction ID and/or trace ID for providing ground truth. For example, this may be processed through data pipelines within client application, logs, such as elastic search (ELK) in the cloud batch (batch style) or processed via online Hypertext Transfer Protocol (HTTP) Rest Service provided or other such techniques. In an alternate example embodiment, it may be possible to track through the transaction ID and trace ID such that when ground truth may be known, the user can post the ground truth to the system interface along with providing transaction ID and trace ID. At step 12, once a certain number of inferences may be reached for the challenger (Model-A-Rel), for example, an hour of time limit, of 1000 inferences/predictions may be completed, the system (pipeline governance 916) may activate the production endpoint of the champion (Model-A-Prod). At this stage, the champion challenger release pipeline may be considered to be in evaluation state. This would mean that the model proxy engine may not replicate payload anymore to the challenger (Model-A-Rel). Further, in step 13, in the evaluation state, the system may evaluate performance of the challenger (Model-A-Rel) in comparison to the champion (Model-A-Prod). If the performance of the challenger (Model-A-Rel) may be higher in comparison to the champion (Model-A-Prod), the system may perform any at least one of the following actions.

- Moving old active endpoint of the model to inactive-endpoints.
- The challenger endpoint may be promoted to production endpoint (and added to active-endpoint in model state).
- Changing the status of champion challenger release pipeline to "Not Active" state.

The champion challenger releases the pipeline and the described strategy ensures that no packages are lost during deployment. The inactive endpoints may be cleaned automatically such that no pipeline may address the deletion of the inactive endpoints. In an example embodiment, self-healing reconciliation loop engine may automatically delete the active endpoints to address the variances in the state (the expected state and the actual state)

Figure 11:
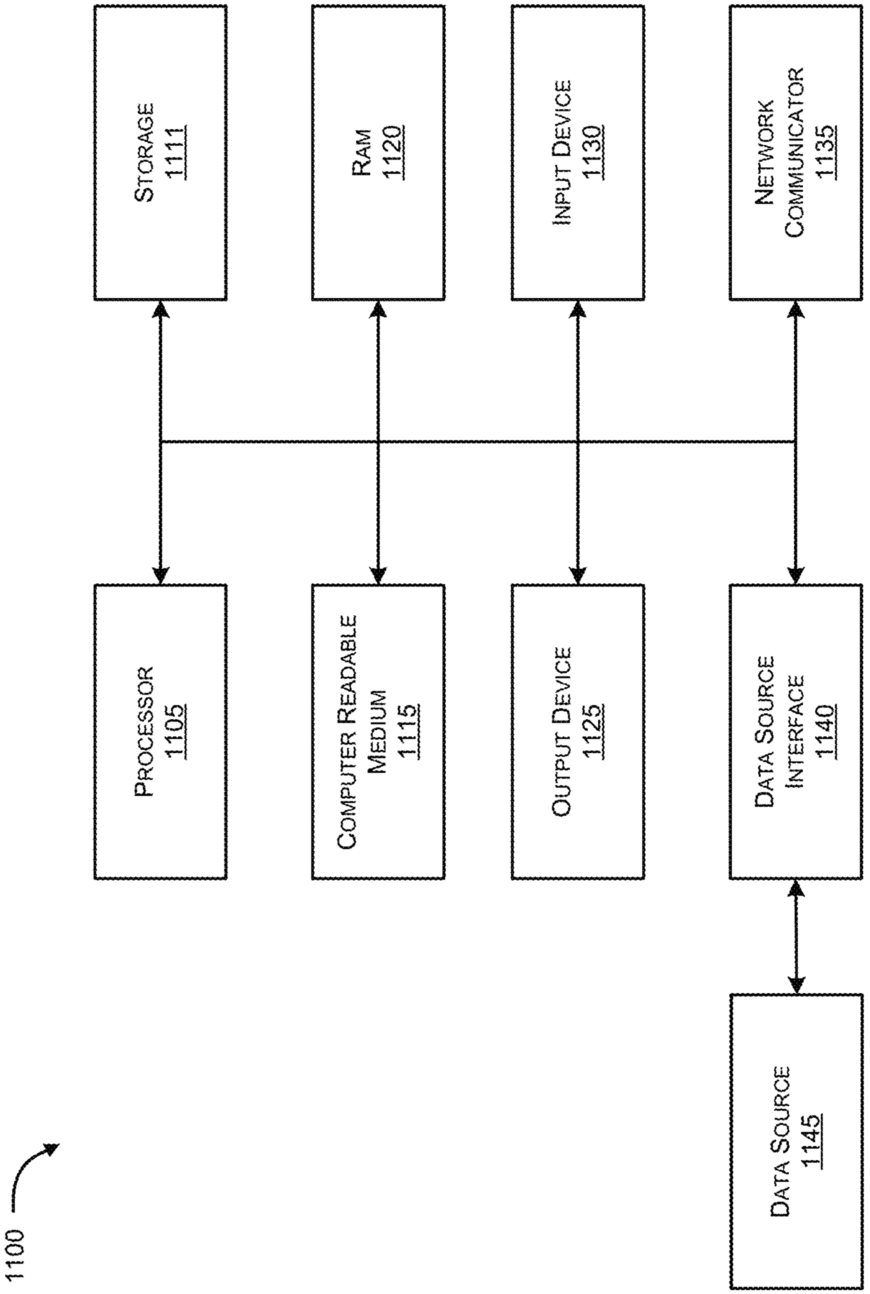
FIG. 11 illustrates a hardware platform for implementation of the disclosed system, according to an example embodiment of the present disclosure.

FIG. 11 illustrates a hardware platform (1100) for implementation of the disclosed system, according to an example embodiment of the present disclosure. For the sake of brevity, construction and operational features of the system 100 which are explained in detail above are not explained in detail herein. Particularly, computing machines such as but not limited to internal/external server clusters, quantum computers, desktops, laptops, smartphones, tablets, and wearables which may be used to execute the system 100 or may include the structure of the hardware platform 1100. As illustrated, the hardware platform 1100 may include additional components not shown, and that some of the components described may be removed and/or modified. For example, a computer system with multiple GPUs may be located on external-cloud platforms including AWS, or internal corporate cloud computing clusters, or organizational computing resources, etc.

The hardware platform 1100 may be a computer system such as the system 100 that may be used with the embodiments described herein. The computer system may represent a computational platform that includes components that may be in a server or another computer system. The computer system may execute, by the processor 1105 (e.g., a single or multiple processors) or other hardware processing circuit, the methods, functions, and other processes described herein. These methods, functions, and other processes may be embodied as machine-readable instructions stored on a computer-readable medium, which may be non-transitory, such as hardware storage devices (e.g., RAM (random access memory), ROM (read-only memory), EPROM (erasable, programmable ROM), EEPROM (electrically erasable, programmable ROM), hard drives, and flash memory). The computer system may include the processor 1105 that executes software instructions or code stored on a non-transitory computer-readable storage medium 1110 to perform methods of the present disclosure. The software code includes, for example, instructions to generate the configuration artifact. In an example, model creator 104, the monitoring engine 106 and the other engines may be software codes or components performing these steps.

The instructions on the computer-readable storage medium 1110 are read and stored the instructions in storage 1115 or in random access memory (RAM). The storage 1115 may provide a space for keeping static data where at least some instructions could be stored for later execution. The stored instructions may be further compiled to generate other representations of the instructions and dynamically stored in the RAM such as RAM 1120. The processor 1105 may read instructions from the RAM 1120 and perform actions as instructed.

The computer system may further include the output device 1125 to provide at least some of the results of the execution as output including, but not limited to, visual information to users, such as external agents. The output device 1125 may include a display on computing devices and virtual reality glasses. For example, the display may be a mobile phone screen or a laptop screen. GUIs and/or text may be presented as an output on the display screen. The computer system may further include an input device 1130 to provide a user or another device with mechanisms for entering data and/or otherwise interact with the computer system. The input device 1130 may include, for example, a keyboard, a keypad, a mouse, or a touchscreen. Each of these output device 1125 and input device 1130 may be joined by one or more additional peripherals. For example, the output device 1125 may be used to display the indicators, measurements and/or metrics that are generated by the ML model of the system 100.

A network communicator 1135 may be provided to connect the computer system to a network and in turn to other devices connected to the network including other clients, servers, data stores, and interfaces, for instance. A network communicator 1135 may include, for example, a network adapter such as a LAN adapter or a wireless adapter. The computer system may include a data sources interface 1140 to access the data source 1145. The data source 1145 may be an information resource. As an example, a database of exceptions and rules may be provided as the data source 1145. Moreover, knowledge repositories and curated data may be other examples of the data source 1145.

Figure 12:
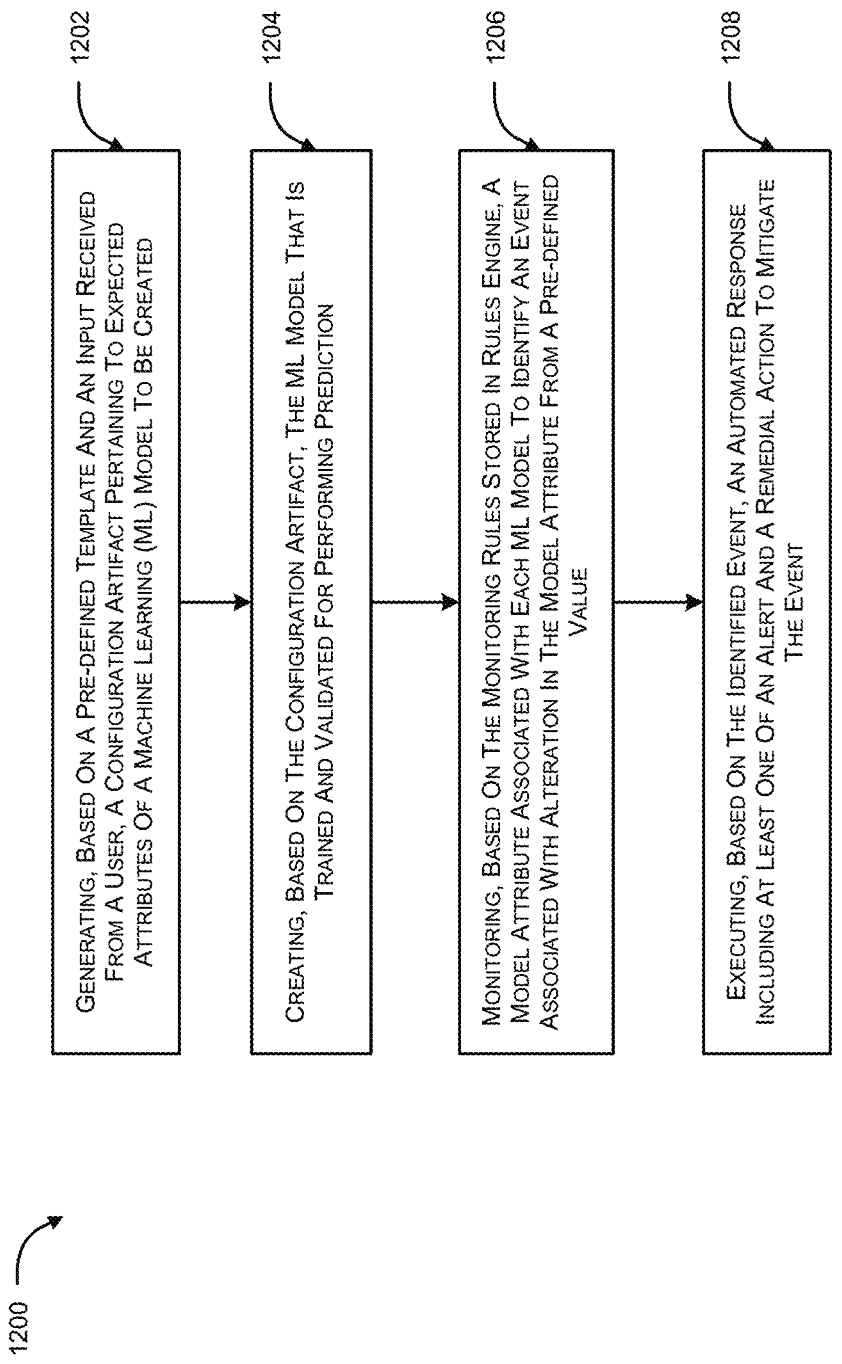
FIG. 12 illustrates a flow diagram for facilitating automated observability of a ML model, according to an example embodiment of the present disclosure.

FIG. 12 illustrates a flow diagram 1200 for facilitating automated observability of a ML model, according to an example embodiment of the present disclosure. At 1202, the method includes a step of generating, based on a pre-defined template and pre-defined inputs, a configuration artifact pertaining to expected attributes of the ML model to be created. The pre-defined template may facilitate incorporation of a set of rules including at least one of monitoring rules and validation rules for the ML model. The set of rules may be stored in a rules engine of the processor. At 1204, the method includes a step of generating, based on the configuration artifact, the ML model that is trained and validated for performing prediction or the inference, wherein the ML model may be stored in a model registry that stores a plurality of ML models. Each ML model being provided with a version tag indicative of a specific version of the ML model. At 1206, the method includes a step of monitoring, based on the monitoring rules stored in the rules engine, a model attribute associated with each ML model to identify an event associated with alteration in the model attribute from a pre-defined value. The identified event may pertain to a model drift indicative of deterioration in an expected performance of the prediction or the inference of the ML model. At 1208, the method includes a step of executing, based on the identified event, an automated response including at least one of an alert and a remedial action to mitigate the event.

In an example embodiment, the method may include a step of receiving, from at least one user application, through an application programming interface (API), a request for performing the prediction or the inference in a consumption stage. The consumption stage may pertain to a given timeline in which the ML model is available for performing the prediction or the inference. Further, the method may include a step of identifying the ML model suitable to perform the prediction or the inference, wherein the ML model may be identified from the plurality of ML models in the model registry. The ML model may be identified based on at least one of a requirement of the prediction or the inference and a traffic information for consumption of the ML model. The request may be directed to a model endpoint pertaining to the ML model for facilitating the prediction or the inference. In an alternate embodiment, the method may include a step of performing an assessment loop to identify the variance in states of components of the ML model. This may be performed by assessing a difference between the expected state and the actual state associated with the version of the ML model. For example, the absence of the variance in states may be indicative of an expected functioning of the model. The presence of variance in state may be indicative of a factor pertaining to at least one of the model drift and introduction of the new version of the ML model. Further, the method may include a step of executing, upon identification of the difference in the expected state and the actual state, an automated self-healing action to facilitate mitigation of the difference in the expected state and the actual state. In yet another alternate embodiment, the method may include a step of assessing the configuration artifact pertaining to the specific version of the model. Further, the method may include a step of updating automatically the configuration database to include the new configuration artifact, upon detection of a new configuration artifact pertaining to the new version of the ML model.

One of ordinary skill in the art will appreciate that techniques consistent with the present disclosure are applicable in other contexts as well without departing from the scope of the disclosure.

What has been described and illustrated herein are examples of the present disclosure. The terms, descriptions, and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

We claim:

1. A system comprising:

a processor comprising:

a model creator executed by the processor to:

generate, based on a pre-defined template and a pre-defined input, a configuration artifact pertaining to expected attributes of a Machine Learning (ML) model to be created, wherein the pre-defined input includes at least one of a pre-stored information and an input received from a user, wherein the configuration artifact corresponds to at least one of an automated training pipeline, the model attributes, a data source and a release pipeline, and wherein the data source is a cloud based computing platform, wherein the pre-defined template facilitates incorporation of a set of rules including at least one of monitoring rules and validation rules for the ML model, wherein the set of rules are stored in a rules engine of the processor; and generate, based on the configuration artifact, the ML model that is trained and validated for performing prediction or inference, wherein the ML model is stored in a model registry that stores a plurality of ML models, each ML model being provided with a version tag indicative of a specific version of the ML model; and a monitoring engine executed by the processor to:

monitor, based on the monitoring rules stored in the rules engine, a model attribute associated with each ML model to identify an event associated with alteration in the model attribute from a pre-defined value, wherein the identified event pertains to a drift indicative of deterioration in an expected performance of the prediction or the inference of the ML model, wherein the drift pertains to at least one of a model drift, a data drift and a concept drift; and wherein, based on the identified event, the system executes an automated response including at least one of an alert and a remedial action to mitigate the event, wherein the remedial action includes execution of at least one of an automated training pipeline, automated update of the configuration artifact, an automatic version rollback and an automated release pipeline of the ML model, wherein the automated release pipeline includes execution of release of the ML model based on the configuration artifact corresponding to the release pipeline, wherein the release pipeline pertains to at least one of a basic rolling update release pipeline and a champion challenger release pipeline, wherein the champion challenger release pipeline evaluates performance of a challenger corresponding to a new version of the ML model in comparison to a champion corresponding to an existing version of the ML model, wherein the champion challenger release pipeline is activated by creation of a variant model endpoint corresponding to the new version for collecting inference for the new version, wherein the new version is released if the performance of the new version exceeds the performance of the existing version, and wherein the new version is not released if the performance of the new version fails to exceed the performance of the existing version; and further the processor is coupled with:

a database comprising a serverless configuration database, and a machine learning operations (MLOps) database, wherein the serverless configuration database stores the configuration artifact and facilitates information related to an expected state pertaining to configuration of components of the ML model and the MLOps database facilitates information related to an actual state pertaining to the components of the ML model.

2. The system as claimed in claim 1, wherein the processor comprises:

a model proxy engine executed by the processor to:

receive, from at least one user application, through an application programming interface (API), a request for performing the prediction or the inference in a consumption stage, wherein the consumption stage pertains to a given timeline in which the version of the ML model is available for performing the prediction or the inference; and identify, from the plurality of ML models in the model registry, the ML model suitable to perform the prediction or the inference, wherein the ML model is identified based on at least one of a requirement of the prediction or the inference and a traffic information for consumption of the ML model, and wherein the model proxy engine directs the request to a model endpoint pertaining to the ML model for facilitating the prediction or the inference.

3. The system as claimed in claim 2, wherein the processor comprises:

a ground-truth engine executed by the processor to:

collect, from the user application, through an application programming interface (API), a set of inferences pertaining to ground truth of the prediction or the inference performed by the ML models, wherein the set of inferences include a pre-defined number of inferences collected over a definite period of time in the consumption stage.

4. The system as claimed in claim 3, wherein the processor comprises:

a metrics engine executed by the processor to:

evaluate the set of inferences received from the ground truth engine to obtain a set of metrics including at least one of model metrics pertaining to the ML model and data metrics pertaining to the pre-stored inputs associated with the ML model, wherein the set of metrics include indicators to facilitate tracking performance of the plurality of ML models.

5. The system as claimed in claim 1, wherein the identified event comprises at least one of a variance in state of components of the ML model, increase execution time of the ML model beyond a predefined limit, modification compliance requirements of the system, modification in policy requirements of the system, modification in the version of the ML model, deviation in the model attributes beyond a pre-defined threshold, and observed deviation data associated with the ML model.

6. The system as claimed in claim 1, wherein the ML model is trained based on the configuration artifact corresponding to the automated training pipeline.

7. The system as claimed in claim 1, wherein the ML model is validated after training based on the validation rules such that the output of the validation engine executed by the processor is transmitted to the rules engine, wherein if the validation rules are satisfied, the ML model is registered for subsequent step of release, and wherein if the validation rules are not satisfied, the system facilitates a notification/recommendation indicating a requirement for correction or confirmation of changes in at least one of the validation rules or dataset for performing re-training of the ML model based on another configuration artifact.

8. The system as claimed in claim 1, wherein the processor comprises:

a self-healing reconciliation loop engine executed by the processor to:

perform an assessment loop to identify the variance in states of components pertaining to the ML model by assessing a difference between the expected state and the actual state pertaining to configuration of components associated with the version of the ML model, wherein the absence of the variance in states is indicative of an expected functioning of the model, and the presence of variance in state is indicative of a factor pertaining to at least one of the model drift and introduction of the new version of the ML model; and a self-healing strategy engine executed by the processor to:

execute, upon identification of the difference in the expected state and the actual state, an automated self-healing action to facilitate mitigation of the difference in the expected state and the actual state.

9. The system as claimed in claim 8, wherein the automated self-healing action corresponds to an action related to at least one of deletion of a component, addition of a component, and update of an existing component of the ML model.

10. The system as claimed in claim 1, wherein the processor comprises:

a control plane reconciliation loop engine executed by the processor to:

assess the configuration artifact pertaining to the specific version of the model, wherein upon detection of a new configuration artifact pertaining to the new version of the ML model, the configuration database is automatically updated to include the new configuration artifact.

11. A method for facilitating automated observability of a ML model, the method comprising:

generating, by a processor, based on a pre-defined template and a pre-defined input, wherein the pre-defined input includes at least one of a pre-stored information and an input received from a user, a configuration artifact pertaining to expected attributes of the ML model to be created, wherein the pre-defined input includes at least one of a pre-stored information and an input received from a user, wherein the configuration artifact corresponds to at least one of an automated training pipeline, the model attributes, a data source and a release pipeline, and wherein the data source is a cloud based computing platform, wherein the pre-defined template facilitates incorporation of a set of rules including at least one of monitoring rules and validation rules for the ML model, wherein the set of rules are stored in a rules engine of the processor;

generating, by the processor, based on the configuration artifact, the ML model that is trained and validated for performing prediction or inference, wherein the ML model is stored in a model registry that stores a plurality of ML models, each ML model being provided with a version tag indicative of a specific version of the ML model;

monitoring, by the processor, based on the monitoring rules stored in the rules engine, a model attribute associated with each ML model to identify an event associated with alteration in the model attribute from a pre-defined value, wherein the identified event pertains to a drift indicative of deterioration in an expected performance of the prediction or the inference of the ML model, wherein the drift pertains to at least one of a model drift, a data drift and a concept drift; and executing, by the processor, based on the identified event, an automated response including at least one of an alert and a remedial action to mitigate the event, wherein the remedial action includes execution of at least one of an automated training pipeline, automated update of the configuration artifact, an automatic version rollback and an automated release pipeline of the ML model, wherein the automated release pipeline includes execution of release of the ML model based on the configuration artifact corresponding to the release pipeline, wherein the release pipeline pertains to at least one of a basic rolling update release pipeline and a champion challenger release pipeline, wherein the champion challenger release pipeline evaluates performance of a challenger corresponding to a new version of the ML model in comparison to a champion corresponding to an existing version of the ML model, wherein the champion challenger release pipeline is activated by creation of a variant model endpoint corresponding to the new version for collecting inference for the new version, wherein the new version is released if the performance of the new version exceeds the performance of the existing version, and wherein the new version is not released if the performance of the new version fails to exceed the performance of the existing version; and further the processor is coupled with:

a database comprising a serverless configuration database, and a machine learning operations (MLOps) database, wherein the serverless configuration database stores the configuration artifact and facilitates information related to an expected state pertaining to configuration of components of the ML model and the MLOps database facilitates information related to an actual state pertaining to the components of the ML model.

12. The method as claimed in claim 11, the method comprising:

receiving, by the processor, from at least one user application, through an application programming interface (API), a request for performing the prediction or the inference in a consumption stage, wherein the consumption stage pertains to a given timeline in which the ML model is available for performing the prediction or the inference; and identifying, by the processor, from the plurality of ML models in the model registry, the ML model suitable to perform the prediction or the inference, wherein the ML model is identified based on at least one of a requirement of the prediction or the inference and a traffic information for consumption of the ML model, and wherein the request is directed to a model endpoint pertaining to the ML model for facilitating the prediction or the inference.

13. The method as claimed in claim 11, the method comprising:

performing, by the processor, an assessment loop to identify the variance in states of components of the ML model by assessing a difference between the expected state and the actual state associated with the version of the ML model, wherein the absence of the variance in states is indicative of an expected functioning of the model, and the presence of variance in state is indicative of a factor pertaining to at least one of the model drift and introduction of the new version of the ML model; and executing, by the processor, upon identification of the difference in the expected state and the actual state, an automated self-healing action to facilitate mitigation of the difference in the expected state and the actual state.

14. The method as claimed in claim 11, the method comprising:

assessing, by the processor, the configuration artifact pertaining to the specific version of the model, upon detection of a new configuration artifact pertaining to the new version of the ML model, updating automatically, by the processor, the configuration database to include the new configuration artifact.

15. A non-transitory computer readable medium, wherein the readable medium comprises machine executable instructions that are executable by a processor to:

generate, based on a pre-defined template and a pre-defined input, wherein the pre-defined input includes at least one of a pre-stored information and an input received from a user, a configuration artifact pertaining to expected attributes of the ML model to be created, wherein the pre-defined input includes at least one of a pre-stored information and an input received from a user, wherein the configuration artifact corresponds to at least one of an automated training pipeline, the model attributes, a data source and a release pipeline, and wherein the data source is a cloud based computing platform, wherein the pre-defined template facilitates incorporation of a set of rules including at least one of monitoring rules and validation rules for the ML model, wherein the set of rules are stored in a rules engine of the processor;

generate, based on the configuration artifact, the ML model that is trained and validated for performing prediction or inference, wherein the ML model is stored in a model registry that stores a plurality of ML models, each ML model being provided with a version tag indicative of a specific version of the ML model;

monitor, based on the monitoring rules stored in the rules engine, a model attribute associated with each ML model to identify an event associated with alteration in the model attribute from a pre-defined value, wherein the identified event pertains to a drift indicative of deterioration in an expected performance of the prediction or the inference of the ML model, wherein the drift pertains to at least one of a model drift, a data drift and a concept drift; and execute, based on the identified event, an automated response including at least one of an alert and a remedial action to mitigate the event, wherein the remedial action includes execution of at least one of an automated training pipeline, automated update of the configuration artifact, an automatic version rollback and an automated release pipeline of the ML model, wherein the automated release pipeline includes execution of release of the ML model based on the configuration artifact corresponding to the release pipeline, wherein the release pipeline pertains to at least one of a basic rolling update release pipeline and a champion challenger release pipeline, wherein the champion challenger release pipeline evaluates performance of a challenger corresponding to a new version of the ML model in comparison to a champion corresponding to an existing version of the ML model, wherein the champion challenger release pipeline is activated by creation of a variant model endpoint corresponding to the new version for collecting inference for the new version, wherein the new version is released if the performance of the new version exceeds the performance of the existing version, and wherein the new version is not released if the performance of the new version fails to exceed the performance of the existing version; and further the processor is coupled with:

a database comprising a serverless configuration database, and a machine learning operations (MLOps) database, wherein the serverless configuration database stores the configuration artifact and facilitates information related to an expected state pertaining to configuration of components of the ML model and the MLOps database facilitates information related to an actual state pertaining to the components of the ML model.

* * * * *